US012256174B2

(12) United States Patent
Myers et al.

(10) Patent No.: US 12,256,174 B2
(45) Date of Patent: Mar. 18, 2025

(54) IN-MEETING CONTENT PRESENTATION MANAGEMENT

(71) Applicant: Seismic Software, Inc., San Diego, CA (US)

(72) Inventors: Daniel Richard Myers, Dexter, MI (US); Thomas H. Strader, Northlake, TX (US); Sean Bradley, Oceanside, CA (US); Dorin Chien-Yi Shen, Gainesville, FL (US); Alexander Jason Rosenfeld, Boston, MA (US)

(73) Assignee: Seismic Software, Inc., San Diego, CA (US)

( * ) Notice: Subject to any disclaimer, the term of this patent is extended or adjusted under 35 U.S.C. 154(b) by 0 days.

(21) Appl. No.: 18/770,391

(22) Filed: Jul. 11, 2024

(65) Prior Publication Data

US 2025/0055958 A1     Feb. 13, 2025

Related U.S. Application Data

(60) Provisional application No. 63/531,754, filed on Aug. 9, 2023.

(51) Int. Cl.
*H04N 7/15* (2006.01)

(52) U.S. Cl.
CPC ............. *H04N 7/152* (2013.01); *H04N 7/155* (2013.01)

(58) Field of Classification Search
None
See application file for complete search history.

(56) References Cited

U.S. PATENT DOCUMENTS

| | | | |
|---|---|---|---|
| 11,093,630 B2 * | 8/2021 | Leonard | G06F 3/0484 |
| 12,019,946 B1 * | 6/2024 | Chau | G06F 40/197 |
| 2016/0117517 A1 * | 4/2016 | Li | G06F 21/44 |
| | | | 715/273 |
| 2019/0073490 A1 * | 3/2019 | Agrawal | G06F 3/1454 |
| 2020/0342131 A1 * | 10/2020 | Giralt | G06F 3/0484 |
| 2020/0351265 A1 * | 11/2020 | Srinath | H04N 7/152 |
| 2022/0021680 A1 * | 1/2022 | Roedel | H04N 7/155 |
| 2023/0300180 A1 * | 9/2023 | Toohey | H04L 65/4015 |
| | | | 348/14.03 |
| 2024/0243941 A1 * | 7/2024 | Nambannor Kunnath | ............ |
| | | | H04L 12/1831 |

* cited by examiner

*Primary Examiner* — Stella L. Woo
(74) *Attorney, Agent, or Firm* — Van Pelt, Yi & James LLP

(57) ABSTRACT

Embodiments of in-meeting content presentation management are disclosed, including: receiving a selection of an asset to be presented during a video conferencing meeting along a plurality of meeting participants, wherein the asset is selected from an approved subset of assets stored at a content storage; determining that a meeting participant of the plurality of meeting participants is not approved to view the selected asset; and preventing the selected asset from being presented to the plurality of meeting participants within the video conferencing meeting.

20 Claims, 17 Drawing Sheets

Create meeting

Meeting records will be saved in Engagement Center as a new engagement type.

Name*

[Meeting with Acme Corp.] — 502

People

☐ John West × ☐ Monica Hamilton ×
☐ Andrew Mak × ☐ Greg Quin ×
— 504

☐ Related to ☐ Acme Corp. × + Add Opportunity

The people field is for contact records. Adding contacts to this field will not send out emails, meeting invites, or create a meeting on your calender.

Meeting content (2)  Additional resources (0)

Add and reorder primary content — 510  + Add

[Seismic Aura Copilot Pilot Pro...]
[Seismic Aura]

— 508

Start presentation    Save — 512

Shared today at 9:59 AM from web (Link)

Occurred on today at 9:58 AM

2 ☐ Sto SE & Co. KGaA & Seismic

6 ☐ Morningstar | Seismic – intro

FIG. 5

IN-MEETING CONTENT PRESENTATION MANAGEMENT

CROSS REFERENCE TO OTHER APPLICATIONS

This application claims priority to U.S. Provisional Patent Application No. 63/531,754 entitled IN-MEETING CONTENT PRESENTATION MANAGEMENT filed Aug. 9, 2023 which is incorporated herein by reference for all purposes.

BACKGROUND OF THE INVENTION

During a video conferencing meeting using a video conferencing platform, a meeting participant who has permission to share their screen can typically screen share any document or application from their local device. However, there may be restrictions (e.g., regulations) on which type of users can view which content. Typical video conferencing platforms do not prevent the screen share of noncompliant content. It would be desirable to limit the screenshare of noncompliant content during video conferencing.

BRIEF DESCRIPTION OF THE DRAWINGS

Various embodiments of the invention are disclosed in the following detailed description and the accompanying drawings.

FIG. 5 is a diagram showing an example user interface for creating a new meeting record in accordance with some embodiments.

DETAILED DESCRIPTION

Figure 1:
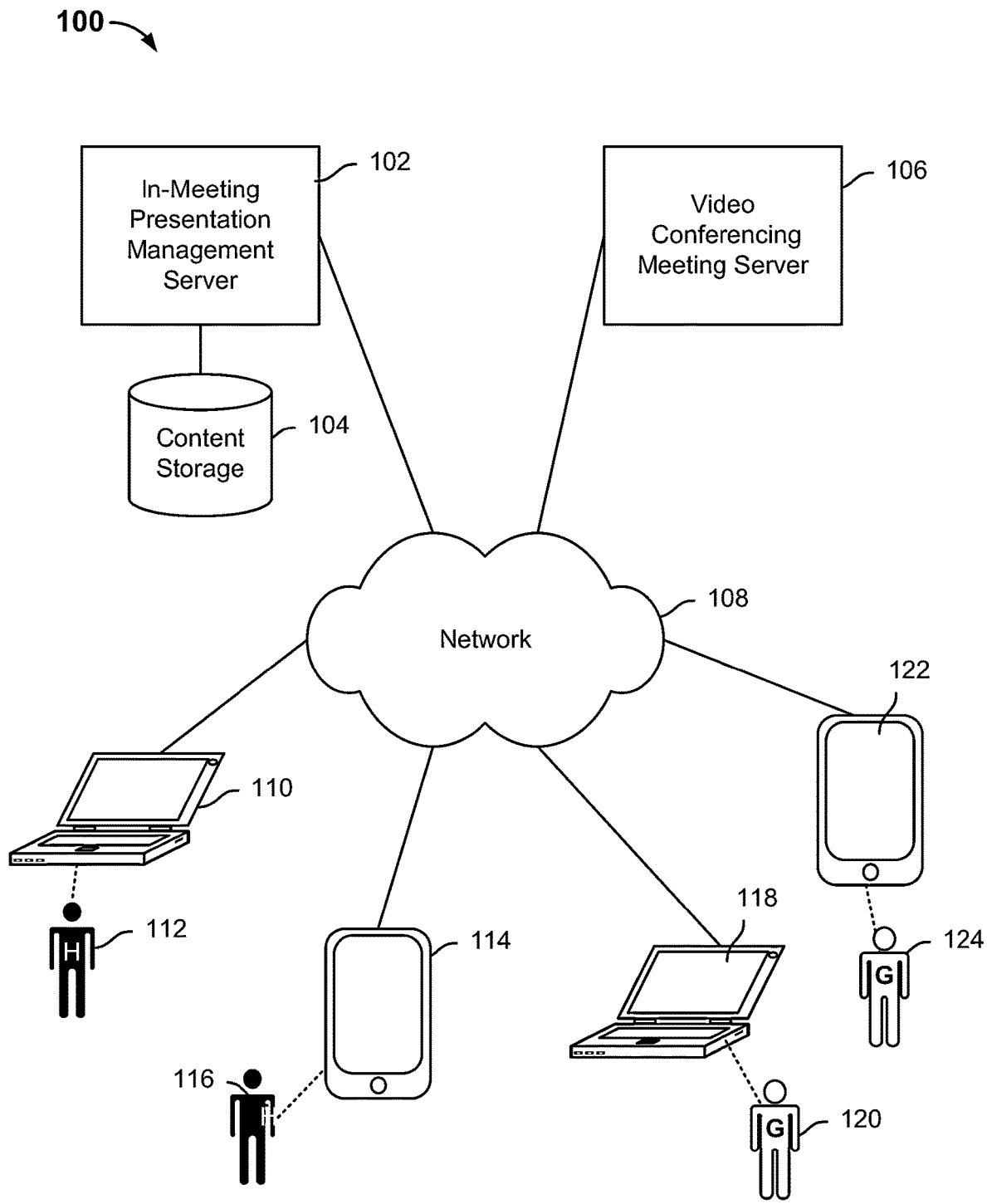
FIG. 1 is a diagram showing an embodiment of a system for in-meeting content presentation management.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of in-meeting content presentation management are described herein. In various embodiments, prior to the start of the video conferencing meeting, a corresponding meeting record is generated. The meeting record was prepared/generated to identify at least a set of anticipated meeting participants and a subset of assets stored at a content storage that are potentially to be presented during the future meeting. Examples of types of assets may include slide decks (e.g., Microsoft PowerPoint® or Google Slides®), videos, images, documents (e.g., PDF, Word Document®, Google Doc®, Keynote®), and websites. The set of anticipated participants identifies at least one meeting host participant (who can select and control the presentation of assets during the meeting) and at least one meeting guest participant (who cannot select or control the presentation of assets during the meeting). Also, prior to the start of the meeting, the meeting record is evaluated against one or more rules to determine whether the identified assets can be presented (e.g., shared via a screen presented during the video conferencing meeting) with the identified meeting participant(s). If the rules are complied with, then the meeting record is approved and so the assets and meeting participants identified within the record are considered to be "approved" for respectively being presented to/shared with and for viewing such assets during the meeting. Later, while a video conferencing meeting corresponding to the approved meeting record is in progress, a selection of an approved asset (e.g., from the meeting record) to be presented during the meeting is received. It is determined whether a meeting participant of the current plurality of participants of the meeting is not approved to view the selected asset (based on the approved meeting record). In response to the determination, the selected asset is prevented from being presented to the current plurality of participants within the video conferencing meeting. As will be described in further detail below, the presentation of approved content (e.g., as defined by a meeting record that is created in advance of the meeting) is dynamically controlled within a video conferencing meeting to enforce that only approved meeting participants can view the presentation of such content.

FIG. 1 is a diagram showing an embodiment of a system for in-meeting content presentation management. In the example of FIG. 1, system 100 includes in-meeting presentation management server 102, content storage 104, video conferencing meeting server 106, network 108, device 110, device 114, device 118, and device 122. In some embodiments, network 108 comprises one or more data and/or telecommunications networks. In some embodiments, in-meeting presentation management server 102, content storage 104, video conferencing meeting server 106, device 110, device 114, device 118, and device 122 communicate over network 108. Examples of each of device 110, device 114, device 118, and device 122 may include a laptop computer, a desktop computer, a mobile device, a tablet, and/or any networked device.

Content storage 104 comprises a content library that is configured to store assets. In various embodiments, each asset stored at content storage 104 includes zero or more tags (or other types of metadata), which can be evaluated against rules during a meeting record approval process. In some embodiments, content storage 104 stores assets of different file types. As mentioned above, example types of assets may include slides (e.g., Microsoft PowerPoint® or Google Slides®), videos, images, and documents. For example, content storage 104 may store assets with different attributes and therefore tags. Specifically, assets stored at content storage 104 might be in different languages, be localized to different regions, and include relevant content that is specific to different types of audiences. In a specific example, three different assets (slide decks) stored at content storage 104 may each include information related to providing an overview of year-end financial information, only that a first slide deck includes financial information related to Enterprise A, the second slide deck includes financial information related to Enterprise B, and the third slide deck includes financial information related to Enterprise C. In some embodiments, before an asset is permitted to be stored at and/or accessible from content storage 104 ("published" at the content library), the asset is first subject to an approval process to ensure that only assets that meet desired criteria are made available at content storage 104 to be presented (e.g., screen shared) during video conferencing meetings, as will be described in further detail below. Content storage 104 may be dynamically updated to receive new assets and updated assets that replace previously stored assets by one or more content contributor users (not shown in FIG. 1). For example, various content contributor users that are proficient in different languages, possess different domain expertise, and are capable of different asset type generation can create assets (e.g., that are associated with corresponding tags of their attributes such as language, category, department, relative time period) that are stored at content storage 104 and then update the assets, as needed, over time.

In-meeting presentation management server 102 is configured to access content storage 104 (e.g., locally or over a network such as network 108). In various embodiments, in-meeting presentation management server 102 is configured to receive a creation of a new meeting record that corresponds to a video conferencing meeting that is to take place at a future time (e.g., relative to the creation time of the meeting record). In some embodiments, in-meeting presentation management server 102 is configured to provide a (e.g., web-based) meeting record editor user interface that a user can access at uniform resource locator to configure a new meeting record. Through the meeting record editor user interface, the user can submit information such as identifying information associated with the meeting (e.g., the name of the meeting and the scheduled time of the meeting), identifying information associated with the anticipated participants of the meeting, and selections of one or more assets stored at content storage 104 that are potentially to be presented (e.g., screen shared) to the participants during the meeting. In some embodiments, identifying information associated with the anticipated participants may describe individual meeting participants (e.g., the specific emails of individuals) and/or types of meeting participants (e.g., any participants with a specified email domain). In some embodiments, identifying information associated with the anticipated participants may identify a role of each participant in the meeting. Examples of a meeting participant's role may include either a "host" or a "guest." For example, the user that creates/edits the meeting record may identify themself as a meeting "host" type of participant. After the meeting record is prepared through the meeting record editor user interface, the user can submit the record for approval.

In various embodiments, in-meeting presentation management server 102 is configured to evaluate a submitted meeting record for approval. In some embodiments, to determine whether the meeting record is approved, in-meeting presentation management server 102 is configured to evaluate whether the anticipated meeting participants identified within the record and the asset(s) identified within the record comply with one or more rules. For example, a rule may dictate that a meeting "guest" participant can only view assets that are tagged with the enterprise for which the "guest" participant is currently an employee. Put another way, in-meeting presentation management server 102 is configured to compare the attributes of identified meeting participants with the metadata (e.g., content properties, categories, and tags) of identified asset(s) based on rule(s) to determine whether the rule(s) can be complied with. In the event that at least one rule is not complied with given the anticipated meeting participants and asset(s) identified in the meeting record, in-meeting presentation management server 102 is configured to reject the meeting record and prompt the record submitter user (e.g., at the meeting record editor user interface) to revise the record to comply with the violated rule(s). Otherwise, in the event that all the rules are complied with given the anticipated meeting participants and assets identified in the meeting record, in-meeting presentation management server 102 is configured to determine that the record is "approved." The effect of an "approved" meeting record is that, during the actual video conferencing meeting that corresponds to the record, the asset(s) identified within the record are approved to be presented (e.g., screen shared) to the meeting participants identified within the record. Stated another way, only the meeting participants identified within the record are approved to view (e.g., via screen share) the asset(s) identified within the record during the meeting.

In-meeting presentation management server 102 is configured to receive an indication that the video conferencing meeting that corresponds to an approved meeting record is starting/in-progress. In various embodiments, the video conferencing meeting is hosted by a third-party video conferencing platform that is operated by video conferencing meeting server 106. Each meeting participant may access the meeting by selecting a link or inputting unique meeting information into a video conferencing platform-specific software application that is installed and executing at a device (e.g., a computer or a mobile device) that is used by that participant. To access the meeting, each participant is also to identify themselves by entering into the video conferencing platform-specific software application their identifying information (e.g., an email or other login information). During the video conferencing meeting that is hosted by video conferencing meeting server 106, the participants can speak to each other and share video footage of themselves (as captured through their cameras) in a virtual space/room. In various embodiments, a custom application that is provided by in-meeting presentation management server 102 executes within the video conferencing platform-specific software application. In some embodiments, the in-meeting presentation management custom application is a plug-in to the video conferencing platform-specific software application and is implemented using a software development kit that is provided by video conferencing meeting server 106 to outside developers. Whereas the video conferencing platform-specific software application executing at the respective devices of meeting participants typically permits screen sharing by participants (e.g., in which participants can share through presenting what is shown on his or her own screen), in various embodiments, the video conferencing platform-specific software application's native screen share option is disabled (e.g., by the in-meeting presentation management custom application or by an administrator of an organization's video conferencing platform account) for all of the participants of the video conferencing meeting. As a consequence, the only screenshare option during a video conferencing meeting in accordance with various embodiments is via the custom application provided by in-meeting presentation management server 102.

Throughout the video conferencing meeting that corresponds to an approved meeting record, in-meeting presentation management server 102 is configured to dynamically control the presentation/screen share of content to current participants of the meeting to comply with the approved asset(s) and approved meeting participants identified within the record. In various embodiments, the in-meeting presentation management custom application within the video conferencing platform-specific software application is configured to display only the approved one or more assets as selectable options to screen share. As will be described in further detail below, in particular, only the meeting participants that are identified in "host" roles are presented the list of approved asset(s) as candidates for presentation/screen sharing within their respective custom application's user interface while other meeting participants (with the role of "guest") are not presented with the list of approved asset(s) at all within their respective custom application's user interface. Because meeting participants can dynamically join or leave the video conferencing meeting while the meeting is in-progress, in response to each event of a new participant joining or an existing participant leaving, in-meeting presentation management server 102 is configured to determine whether an approved asset of the approved meeting record can be permitted to be presented/screen shared through the respective custom applications to the current set of meeting participants. As will be described in further detail below, in various embodiments, in-meeting presentation management server 102 is configured to only enable the screen share (as initiated by a meeting host participant) of an approved asset within the respective custom applications of the meeting participants' video conferencing platform-specific software applications as long as each current meeting participant corresponds to an approved participant that is identified in the approved meeting record. Put another way, as long as one current meeting participant is not an approved participant that is identified in the approved meeting record, then in-meeting presentation management server 102 is configured to dynamically prevent (e.g., by temporarily disabling, pausing, or otherwise rendering unreadable) the screen share of an approved asset within the respective custom applications of the meeting participants' video conferencing platform-specific software applications (e.g., until the unapproved meeting participant(s) leave the meeting).

In some embodiments, in-meeting presentation management server 102 is configured to track metrics pertaining to which approved assets are actually presented/screen shared through the custom application during a meeting. For example, the tracked metrics that form audit data with respect to approved asset presentation during a meeting may include which portions of each asset were presented, for how long, and to which meeting participants.

The following is an example with reference to FIG. 1 that illustrates the dynamic in-meeting presentation management in accordance with some embodiments described herein:

In advance of a video conferencing meeting, a corresponding approved meeting record had identified approved anticipated participants 112, 116, and 120 and approved assets Slides_A and Slides_B (not shown in FIG. 1). In particular, the approved meeting record identified both participants 112 and 116 as "hosts" in the meeting and participant 120 as a "guest" in the meeting. During the actual video conferencing meeting (corresponding to the approved meeting record) that is hosted by video conferencing meeting server 106, each of participants 112, 116, and 120 access the virtual/video conference room through respective video conferencing platform-specific software applications that are executing at their respective devices 110, 114, and 118. In each such instance of a video conferencing platform-specific software application, the native screen sharing function is disabled/suppressed. Furthermore, in each such instance of a video conferencing platform-specific software application, a custom application/plugin that is provided by in-meeting presentation management server 102 is executing. As a result, during the video conferencing meeting corresponding to the approved meeting record, only the instances of the custom application that are executing at respective devices 110 and 114 show Slides_A and Slides_B as possible options to select to screen share during the meeting because only participants 112 and 116 are "hosts" in the meeting and therefore have permission to enable/control the presentation/screen share of asset(s). Conversely, the instance of the custom application that is executing at device 118 does not show either Slides_A or Slides_B as possible options to select to screen share because participant 120 is a "guest" in the meeting and therefore does not have permission to enable/control the presentation/screen share of asset(s). Nevertheless, because all participants 112, 116, and 120 are approved participants within the meeting in accordance with the approved meeting record, all participants 112, 116, and 120 are permitted to view the presentation/screen share of Slides_A and Slides_B (e.g., as initiated or controlled by either of host participants 112 and 116) through their respective instances of the custom application during the meeting. However, if in-meeting presentation management server 102 detects that participant 124 joins the video conferencing meeting via device 122 as the meeting is in-progress and determines that participant 124 does not match an approved participant in accordance with the approved meeting record, then in-meeting presentation management server 102 is configured to prevent (e.g., via disabling, pausing, or otherwise rendering unreadable) the presentation/screen share of either Slides_A or Slides_B in the custom application until either the meeting ends or participant 124 is detected to leave the meeting. For example, if participant 124 is detected to have left the meeting, then the presentation/screen share of the approved asset is resumed. Put another way, while unapproved participant 124 is detected to be a current participant in the meeting, the presentation/screen share of either Slides_A or Slides_B is rendered unviewable in the instance of the custom application of at least device 122 (if not also the instances of the customer applications executing at the devices 110, 114, and 118 of respective participants 112, 116, and 120) until participant 124 leaves the meeting, after which the presentation/screen share of either Slides_A or Slides_B is again rendered viewable within the instances of the customer applications executing at devices 110, 114, and 118 of respective participants 112, 116, and 120.

As shown in FIG. 1, system 100 enables the dynamic management/control of the presentation of content to participants during a video conferencing meeting in accordance with a record that is prepared and approved of in advance of the meeting. During the meeting, it is ensured that the presentation of any content is limited to only the approved assets that are identified in the meeting record. Furthermore, as meeting participants dynamically join or leave throughout the meeting, the presentation of any content is dynamically controlled to only occur/be visible to meeting participants if the current meeting participants are approved participants as identified in the meeting record. Such dynamic in-meeting content presentation management ensures that regulatory restrictions for what content can be presented and to whom are complied with and the risks of screen sharing during video-based meetings are minimized. Furthermore, the presentation of approved content during a meeting can be tracked to obtain detailed meeting analytics (e.g., to meet reporting requirements).

Figure 2:
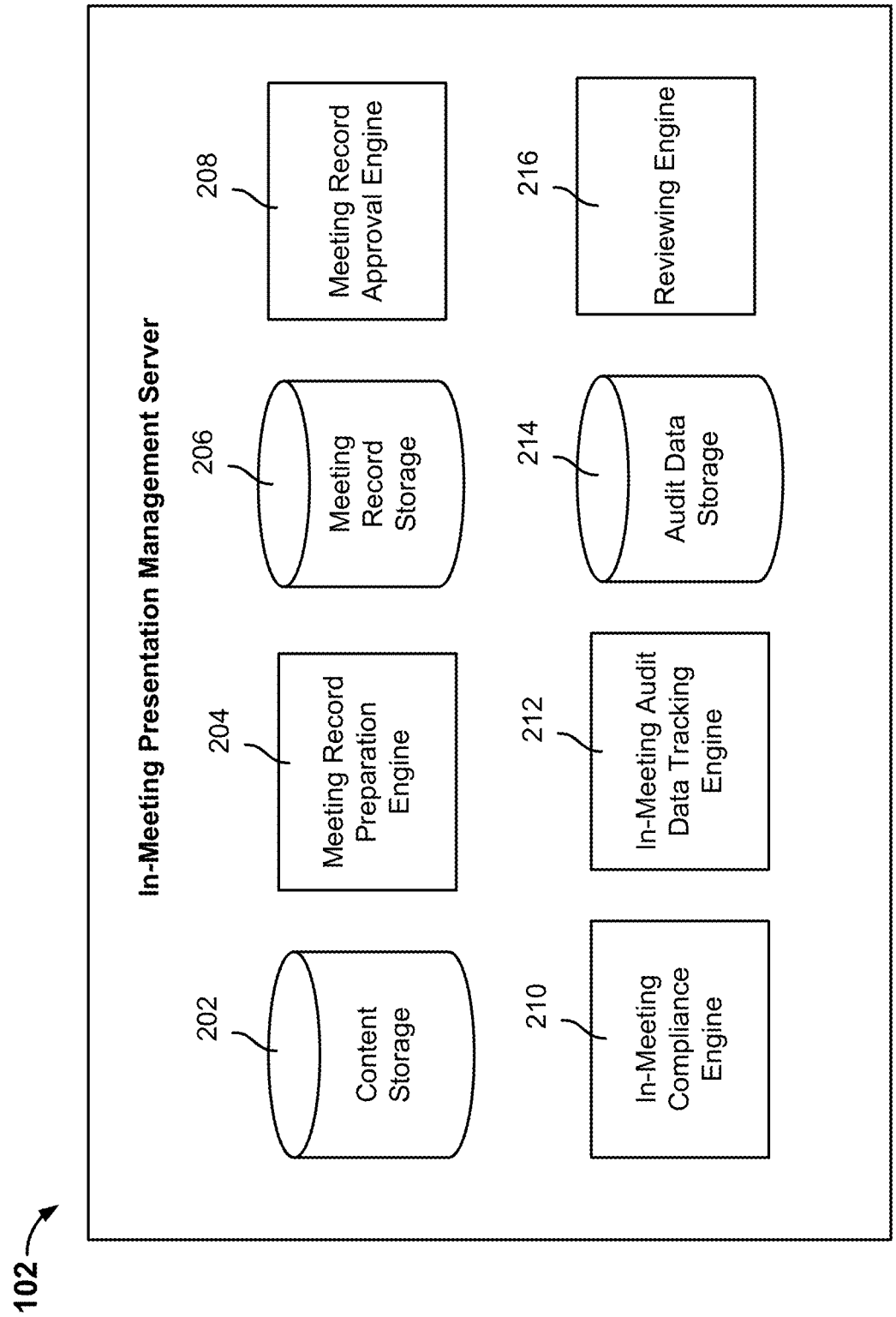
FIG. 2 is a diagram showing an example of an in-meeting presentation management server in accordance with some embodiments.

FIG. 2 is a diagram showing an example of an in-meeting presentation management server in accordance with some embodiments. In some embodiments, in-meeting presentation management server 102 of FIG. 1 may be implemented using the example in-meeting presentation management server of FIG. 2. In the example of FIG. 2, the in-meeting presentation management server includes content storage 202, meeting record preparation engine 204, meeting record storage 206, meeting record approval engine 208, in-meeting compliance engine 210, in-meeting audit data tracking engine 212, audit data storage 214, and reviewing engine 216. Each of content storage 202, meeting record preparation engine 204, meeting record storage 206, meeting record approval engine 208, in-meeting compliance engine 210, in-meeting audit data tracking engine 212, audit data storage 214, and reviewing engine 216 may be implemented using hardware (e.g., one or more processors and memories) and/or software.

Content storage 202 is configured to store assets that are associated with metadata. As mentioned above, examples of asset types include slides (e.g., Microsoft PowerPoint® or Google Slides®), videos, images, and documents. Each asset stored at content storage 202 is configured with metadata (e.g., properties/tags) that indicates, for example, asset type and when to use such content. One example type of asset metadata includes a description of the asset's content (e.g., "Cover slides," "Company Overview Slides," "Case Studies," "Product Sheets," and "ROI calculators"). Another type of asset metadata is a content property and an associated value. One example of a content property is called "Segment" and is associated with a list of possible values such as "Technology," "Medicine," and "Financial Services." For example, an asset that is relevant to the technology industry would be tagged with the content property and value pair of "Segment-Technology." Another example of a content property is called "Geographic Region" and is associated with a list of possible values such as "Asia," "North America," and "Europe." For example, an asset that is relevant to the Asian countries would be tagged with the content property and value pair of "Geographic Region—Asia." Assets' content properties and their associated possible values can be customizable/defined by content contributors. In some embodiments, new assets can be added to, existing assets can be modified at, and existing assets can also be deleted from content storage 202. For example, a new asset including the latest financial information can be added (e.g., by content contributors) quarterly to content storage 202. In some embodiments, before an asset can be added to content storage 202, it is first evaluated against publishing criteria (e.g., whether the content and formatting conform to a desired quality and structure) and the asset can only be added to content storage 202 if the criteria is met. The publishing criteria are enforced to ensure that only assets of high quality are added to content storage 202 because such assets may be presented during one or more video conferencing meetings.

Meeting record preparation engine 204 is configured to enable the creation of a meeting record corresponding to a future video conferencing meeting. In some embodiments, meeting record preparation engine 204 is configured to present a meeting record editor user interface that a user can access at a uniform resource locator to configure a new meeting record. In some embodiments, the meeting record editor user interface provides a form that includes fields and/or other interactive elements that solicit information such as the meeting identifier (e.g., name), the date/time of the meeting, and/or the video conference platform that is to host the meeting. In some embodiments, the meeting record editor user interface provides a form that includes fields and/or other interactive elements that solicit the identifier(s) of anticipated meeting participants. In particular, the identifier(s) of anticipated meeting participants can describe an individual meeting participant (e.g., an individual's email address) and/or describe the attributes of one or more meeting participants (e.g., the email domain and/or the associated organization name). In some embodiments, the anticipated meeting participants may be selected from a customer relationship management database, which stores information about an organization's customers and/or their employees. In some embodiments, each identified anticipated meeting participant in the user interface is denoted with a role with respect to the meeting. For example, the "role" with respect to a meeting may be either "host" or "guest." In a specific example, there are at least two types of "host" roles: a "primary host" and a "secondary host." Depending on the type of the video conference platform that is to host the meeting, a meeting participant with a "host" role may have different levels of control with respect to the managing of the meeting. For instance, the meeting participant in the "primary" host role may be permitted to view the list of the available content to present, select a piece of content to screen share/present during the meeting, control the presentation of the content, and start and/or end the meeting. Also, for instance, the meeting participant in the "secondary" host role may also be permitted to view the list of the available content to present, select a piece of content to screen share/present during the meeting, control the presentation of the content, but not start and/or end the meeting. In various embodiments, a meeting participant with a "guest" role may not be permitted to either view the list of the available content to present, select a piece of content to screen share/present during the meeting, control the presentation of the content, or start and/or end the meeting.

In some embodiments, the meeting record editor user interface also enables the user selection of one or more assets from content storage 202 that may be presented/screen shared during the meeting. For example, the meeting record editor user interface may provide a portal or other interface that presents to the configuring user the assets (e.g., that are available to be selected by the user) that the user can add to the meeting record. The configuring user may select at least one asset from content storage 202 that may be presented/screen shared during the meeting. For example, the configuring user may select all possible assets that may be presented/screen shared during the meeting, including any alternative assets (e.g., different assets that can be alternatively presented during the meeting depending on the behavior of the meeting participants). After the configuring user has completed preparing/creating the meeting record, the user can submit the completed record via the user interface and the meeting record will be subject to approval.

Meeting record storage 206 is configured to store submitted meeting records with corresponding statuses. For example, each meeting record is stored with one or more of the following statuses: waiting for approval, unapproved, and approved. For example, a meeting record that is "waiting for approval" is one that has been user submitted via the meeting record editor user interface provided by meeting record preparation engine 204 and has not yet been subject to the approval process, which will be described in further detail below. A meeting record that is "unapproved" has been subject to the approval process but was not approved. For example, a meeting record that is "unapproved" may also be stored with one or more reasons why it was not approved (e.g., which rule the meeting had violated, and/or which portion of the record violated a rule). During the video conferencing meeting that corresponds to an "unapproved" meeting record, the asset(s) that were identified by the record are not permitted to be presented/screen shared during the meeting to any meeting participants. A meeting record that is "approved" has been subject to the approval process and was approved. During the video conferencing meeting that corresponds to an "approved" meeting record, the asset(s) that were identified by the record are permitted to be presented/screen shared during the meeting to the anticipated meeting participants that were also identified by the record.

Meeting record approval engine 208 is configured to evaluate a submitted meeting record (e.g., received by meeting record preparation engine 204 and/or stored at meeting record storage 206) for approval. In some embodiments, meeting record approval engine 208 is configured to compare the asset(s) and the anticipated meeting participant(s) of a submitted meeting record against one or more predetermined rules. In particular, meeting record approval engine 208 is configured to compare the metadata of the asset(s) and the attributes (e.g., the associated organization, whether the participant is an employee of the organization, the role of the participant within the organization, the geographic area at which the employee is based) of anticipated meeting participant(s) of a submitted meeting record against one or more predetermined rules. For example, the metadata of the asset(s) identified in the meeting record are obtained from content storage 202 and the attributes of the anticipated meeting participant(s) are obtained from the customer relationship management database (e.g., which stores the information and/or relationships among customer organizations and their associated employees). Example rules may prescribe conditions that describe the type(s) of asset metadata that are associated with asset(s) that can be presented to meeting participant(s) of which type(s) of attributes. Meeting record approval engine 208 is configured to compare the metadata of the asset(s) and the attributes of anticipated meeting participant(s) of a submitted meeting record against one or more predetermined rules to determine whether each of the rules are complied with or whether any of the rules are violated. In the event that none of the rules are violated, meeting record approval engine 208 is configured to update the status of that record at meeting record storage 206 to "approved." Otherwise, in the event that at least one of the rules are violated, meeting record approval engine 208 is configured to update the status of that record at meeting record storage 206 to "unapproved." In some embodiments, for a record that is unapproved, meeting record approval engine 208 is also configured to update the status of the record to indicate which asset(s) and which anticipated meeting participant(s) had violated which rule(s). In some embodiments, alternative to or in addition to using rules to evaluate a meeting record for approval, meeting record approval engine 208 is also configured to evaluate the meeting using a machine learning model that has been trained to take as input, asset metadata and the attribute(s) of anticipated meeting participants, and output whether the record identifying those asset(s) and participants is approved or not. In the case where the machine learning model does not approve of a record, then a reviewing user is prompted to review the record for approval. In some embodiments, after an "unapproved" determination on a meeting record, meeting record approval engine 208 is also configured to prompt the configuring user to edit the record via the meeting record editor user interface provided by meeting record preparation engine 204 and then the updated record can be again evaluated by meeting record approval engine 208 for approval.

In-meeting compliance engine 210 is configured to dynamically control the presentation of content during a video conferencing meeting that is hosted by a (e.g., third-party) video conferencing platform. In various embodiments, in-meeting compliance engine 210 is configured to detect when the video conferencing meeting corresponding to a meeting record (e.g., that is stored at meeting record storage 206) is in in-progress. For example, in-meeting compliance engine 210 can detect when a video conferencing meeting has started if a custom application associated with the in-meeting presentation management server is executing within a video conferencing meeting-specific application that is used to conduct the meeting. For example, in-meeting compliance engine 210 can compare the meeting identifier (e.g., the meeting name and/or time) to meeting records (e.g., stored at meeting record storage 206) to determine whether there is a matching record and if so, whether the record is associated with an approved or unapproved status. If there is a matching meeting record but one that is associated with an unapproved status, then in-meeting compliance engine 210 is configured to prevent any assets from being accessible for presentation/screenshare through the custom application that is executing within any instance of the video conferencing meeting-specific application that is used to conduct the meeting. If there is a matching meeting record but one that is associated with an approved status, then in-meeting compliance engine 210 is configured to permit only the assets that have been identified within the approved meeting record to be presented/screen shared during the meeting via the custom application that is executing within the video conferencing meeting-specific application, so long as each meeting participant that is currently in the meeting matches the anticipated meeting participants that are identified in the approved meeting record. As will be described in further detail below, while the meeting remains in-progress, in-meeting compliance engine 210 is configured to detect when a meeting participant joins or leaves the meeting to ensure that a selected asset (from the list of approved assets within the record) is only presented/screen shared (by a meeting host participant) so long as all of the current meeting participants match the anticipated meeting participants that are identified in the approved meeting record.

In-meeting audit data tracking engine 212 is configured to track the content that is presented/screen shared during a video conferencing meeting. Because only asset(s) that are identified within an approved meeting record can be presented via the custom application during a video conferencing meeting, in-meeting audit data tracking engine 212 can have an awareness of which approved asset has been selected to be shared during the meeting and also which portion of an asset (e.g., which slide of a slide deck) has been shared during which portion of the meeting. For example, in-meeting audit data tracking engine 212 can track the segments (e.g., as defined by start and end timestamps) of the meeting at which a portion of an asset was shared. In the event that the meeting was recorded, the segments of the meeting associated with when an asset or portion thereof was shared via the custom application can be analyzed. For example, the video, audio, and/or text transcription of the meeting recording corresponding to the video segments can be analyzed as feedback to the asset and/or presentation of the asset. Furthermore, in-meeting audit data tracking engine 212 can track which meeting participants had joined the meeting and when, which meeting participant(s) were anticipated meeting participant(s) as identified in the approved meeting record and which were not, and when the screen share or the presentation of an approved asset was prevented/paused in the meeting due to the presence of one or more meeting participant(s) that were not anticipated meeting participant(s) as identified in the approved meeting record. Data, including when and which assets were sharing via the custom application and also when, if sharing/presenting of an approved asset was paused, for example, can be stored as audit data corresponding to the meeting at audit data storage 214.

Reviewing engine 216 is configured to review the audit data stored at audit data storage 214. In some embodiments, reviewing engine 216 is configured to aggregate audit data that were generated corresponding to multiple video conferencing meetings to determine analytics with respect to which assets and/or portions thereof had been shared at meetings. In some embodiments, reviewing engine 216 is configured to analyze the video segments corresponding to portions of recorded video conferencing meetings to analyze the video, audio, and/or text transcription thereof for evaluations such as, for example, the sentiment, the quality of presentation by the host(s), and/or the type of feedback from the guests. In some embodiments, reviewing engine 216 is configured to generate recommendations based on the aggregated analytics determined from multiple meetings. For example, reviewing engine 216 can recommend that an asset that was frequently presented during historical meetings and/or well received by meeting participants during such meetings to be included in a new meeting record that is being created by meeting record preparation engine 204.

Figure 3:
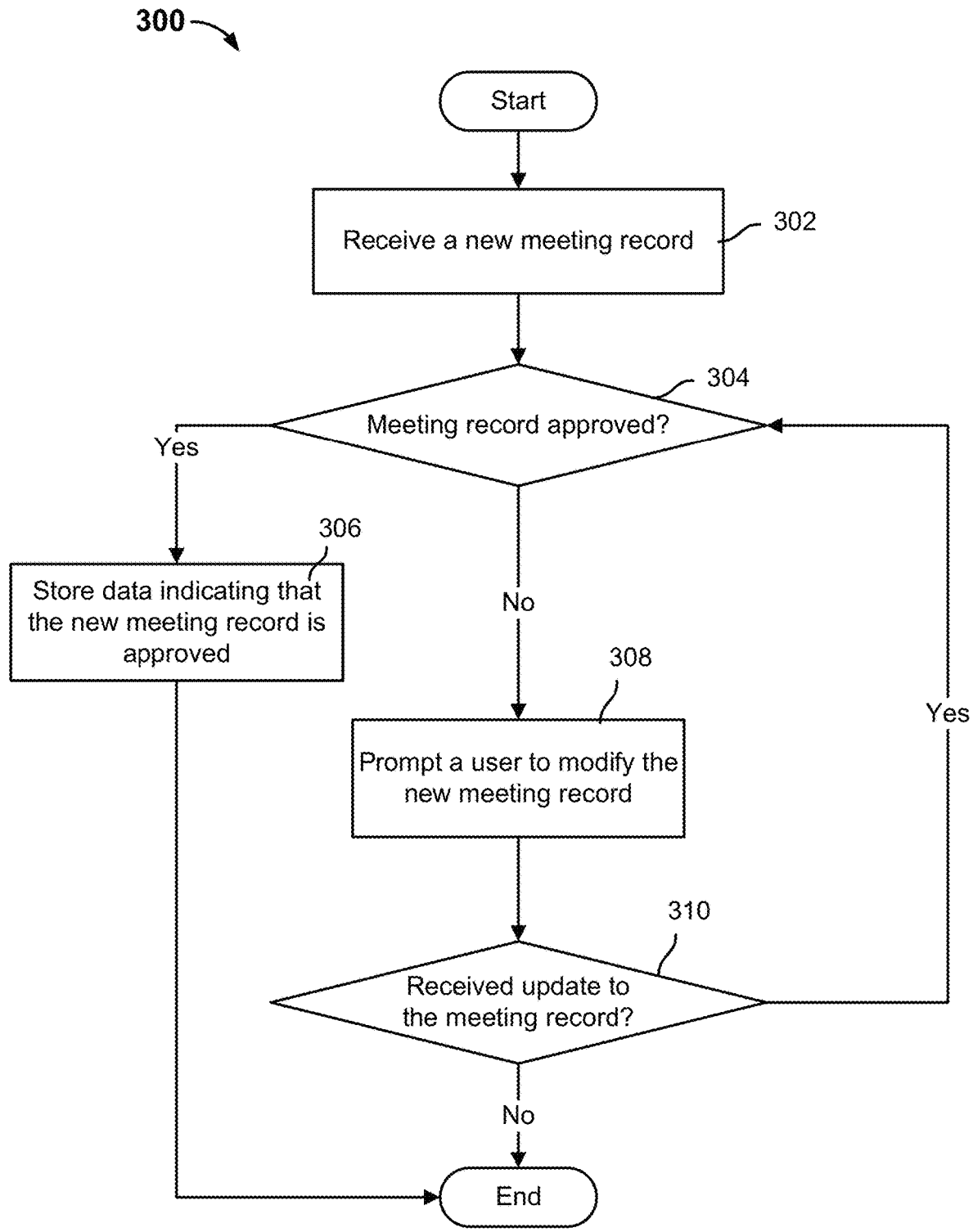
FIG. 3 is a flow diagram showing an example process for obtaining and approving a new meeting record in accordance with some embodiments.

FIG. 3 is a flow diagram showing an example process for obtaining and approving a new meeting record in accordance with some embodiments. In some embodiments, process 300 may be implemented, at least in part, on in-meeting presentation management server 102 of FIG. 1.

Process 300 describes an example process for obtaining and approving a new meeting record in advance of a corresponding video conferencing meeting.

At 302, a new meeting record is received. As described above, a meeting record corresponding to a future video conferencing meeting may include one or more of the following: meeting identifier, meeting date/time, anticipated meeting participant(s), and asset(s) to potentially present during the meeting. An example process for creating a new meeting record is described below in FIG. 4.

At 304, whether the new meeting record is approved is determined. In the event that the new meeting record is approved, control is transferred to 306. Otherwise, in the event that the new meeting record is not approved, control is transferred to 308. The new meeting record is subjected to an evaluation process to determine whether the record is approved or not. An example process for evaluating a new meeting record for approval is described below in FIG. 6.

At 306, data indicating that the new meeting record is approved is stored. The status of the new meeting record is updated to indicate "approved" and as a result, later, during the video conferencing meeting that corresponds to the record, the asset(s) that are identified in the record are permitted to be presented/screen shared when only the anticipated meeting participants as identified in the record are present in the meeting.

At 308, a user is prompted to modify the new meeting record. The status of the new meeting record is updated to indicate "unapproved" and as a result, later, during the video conferencing meeting that corresponds to the record, no asset(s) that are identified in the record are permitted to be presented/screen shared with any meeting participant. As such, when a meeting record is determined to be unapproved, a user that had configured the meeting record is prompted to edit the meeting record so that the record can conform to the rules that were violated and/or conform to other criteria for becoming approved.

At 310, whether an update to the meeting record is received is determined. In the event that an update to the meeting record is received, control is returned to 304. Otherwise, in the event that an update to the meeting record is not received, process 300 ends. The updated new meeting record is again subjected to an evaluation process to determine whether the record is approved or not.

Figure 4:
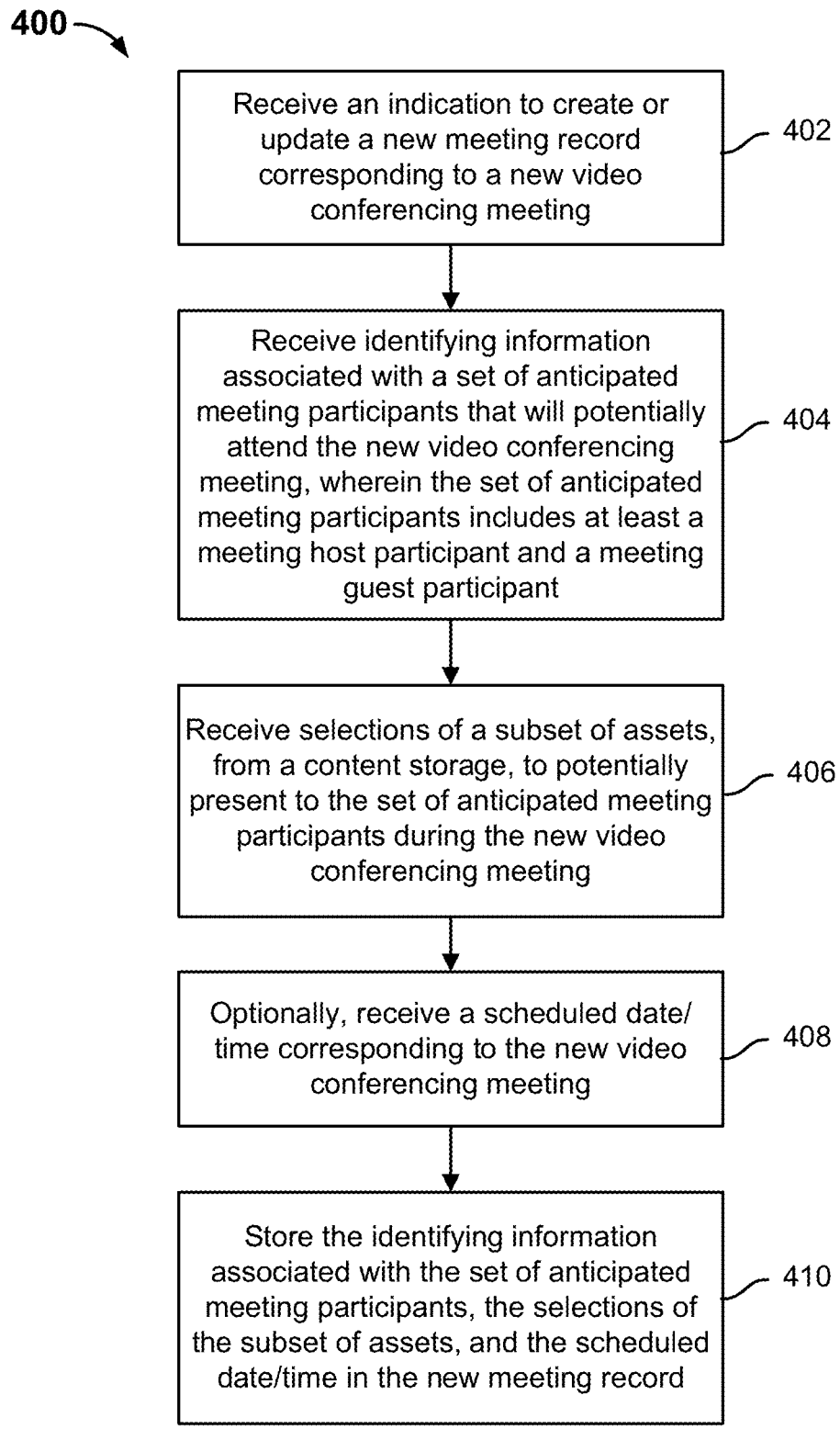
FIG. 4 is a flow diagram showing an example process for obtaining a new meeting record in accordance with some embodiments.

FIG. 4 is a flow diagram showing an example process for obtaining a new meeting record in accordance with some embodiments. In some embodiments, process 400 may be implemented, at least in part, on in-meeting presentation management server 102 of FIG. 1. In some embodiments, step 302 of process 300 may be implemented, at least in part, using process 400.

Process 400 describes an example process for obtaining a new meeting record in advance of a corresponding video conferencing meeting.

At 402, an indication to create or update a new meeting record corresponding to a new video conferencing meeting is received. In various embodiments, the new meeting record is configured by a user over a user interface (the "meeting record editor user interface"). In some embodiments, a meeting name and a name of a video conferencing platform that is to host the future meeting are also obtained via the meeting record editor user interface.

At 404, identifying information associated with a set of anticipated meeting participants that will potentially attend the new video conferencing meeting is received, wherein the set of anticipated meeting participants includes at least a meeting host participant and a meeting guest participant. In some embodiments, the set of anticipated meeting participants is selected from a customer relationship management database. For example, the meeting record editor user interface can be used to access the customer relationship management application via an embedded window and through the embedded window, the user can select one or more individuals in the database to add as anticipated meeting participants to the meeting.

In some embodiments, each anticipated meeting participant is identified by a specified email address or specified name. For instance, if it can be known or anticipated which exact individuals may participate in the future meeting, identifiers of such individuals can be provided in the meeting record.

In some embodiments, the anticipated meeting participants are identified as any individuals that match a specified set of attributes. For example, the specified set of attributes includes having an email that matches a specified email domain and/or being an employee of a specified organization. For instance, if it cannot be known or anticipated which exact individuals may participate in the future meeting but at least some attributes (e.g., the organization with which the participant(s) are associated) that more generally describe such anticipated meeting participants are known, then such attributes can be provided in the meeting record.

In some embodiments, each anticipated meeting participant identifier is also associated with a role with respect to the meeting. In some embodiments, each participant is associated with either being a "host" or a "guest." As will be described in further detail below, during the meeting, a "host" may view the list of approved asset(s) in the record, select an approved asset to present/screenshare, view the content of the asset, and/or control the presentation of the asset. As will be described in further detail below, during the meeting, a "guest" can not view the list of approved asset(s) in the record, select an approved asset to present/screenshare, or control the presentation of the asset but can only view the content of the asset.

At 406, selections of a subset of assets from a content storage to potentially present to the set of anticipated meeting participants during the new video conferencing meeting are received. In some embodiments, one or more assets that are potentially to be presented to/screen shared with the anticipated meeting participants are selected from a content storage (comprising a content library). For example, the meeting record editor user interface can be used to access the content storage via an embedded window and through the embedded window, the user can select one or more assets in the content storage to add as assets to the meeting.

At 408, a scheduled date/time corresponding to the new video conferencing meeting is optionally received. Optionally, a future date and/or time on which the meeting is to be conducted is to be provided in the meeting record.

At 410, the identifying information associated with the set of anticipated meeting participants, the selections of subset of assets, and the scheduled data/time are stored in the new meeting record. The information provided for the meeting record is then stored in the meeting record, which will be evaluated for approval.

FIG. 5 is a diagram showing an example user interface for creating a new meeting record in accordance with some embodiments. In some embodiments, user interface 500 is an example user interface of a meeting record editor user interface as described herein. As shown in FIG. 5, user interface 500 includes fields that solicit identifying information associated with the meeting itself as well as the anticipated participants of the meeting. In particular, field 502 prompts the user to input a name for the meeting ("Meeting with Acme Corp.") and field 504 prompts for identifiers of the anticipated participants of the meeting. For example, in FIG. 5, each of anticipated participants ("John West," "Monica Hamilton," "Andrew Mak," and "Greg Quin") whose identifiers appear in field 504 had been selected from a customer relationships management database. While not shown in FIG. 5, in some embodiments, each identified anticipated participant is associated with a specified role in the meeting, including "host" or "guest." While not shown in FIG. 5, in some embodiments, user interface 500 includes a field or interactive element that enables the configuring user to input a future date/time at which the meeting is expected to be conducted.

Window 508 of user interface 500 includes the selection of assets from a content storage that are potentially to be presented/screen shared during the meeting. As shown in FIG. 5, the configuring user had already selected two assets (the two slide decks of "Seismic Aura Copilot Pilot Pro . . . " and "Seismic Aura") to add to the meeting record. To add additional assets, the configuring user can select "+Add" button 510 to choose additional assets from the content storage to add to the record. The configuring user can also reorder the list of selected assets via window 508. After the configuring user has completed their creation of the record, they can submit the record for view by selecting "Save" button 512.

Figure 6:
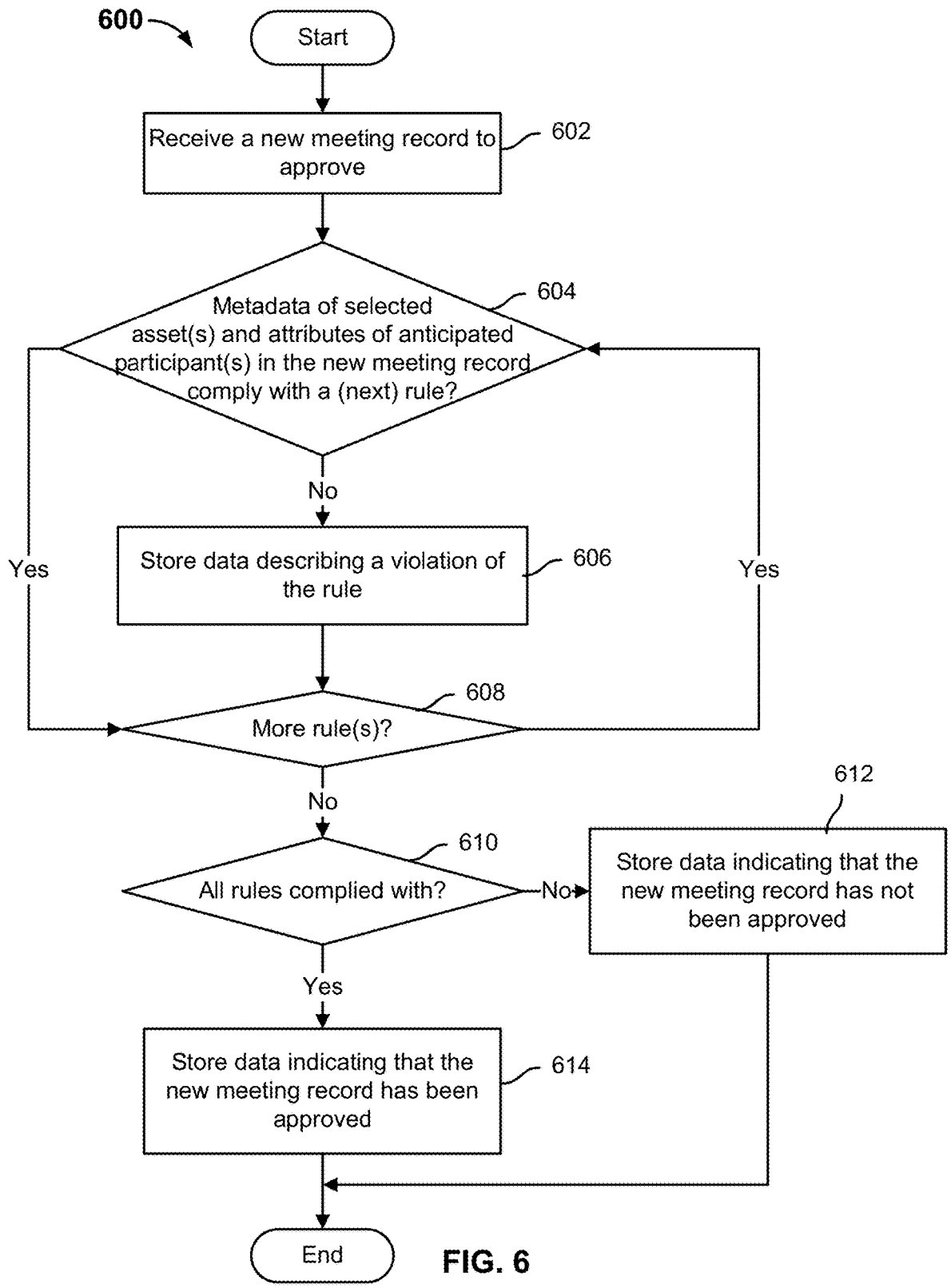
FIG. 6 is a flow diagram showing an example process for evaluating a new meeting record for approval in accordance with some embodiments.

FIG. 6 is a flow diagram showing an example process for evaluating a new meeting record for approval in accordance with some embodiments. In some embodiments, process 600 may be implemented, at least in part, on in-meeting presentation management server 102 of FIG. 1. In some embodiments, steps 304, 306, and 308 of process 300 may be implemented, at least in part, using process 600.

Process 600 describes an example process for evaluating a new meeting record in advance of a corresponding video conferencing meeting.

At 602, a new meeting record to approve is received. In some embodiments, the new meeting record was created using a process such as process 400 of FIG. 4.

At 604, whether metadata of selected asset(s) and attributes of anticipated participant(s) in the new meeting record comply with a (next) rule is determined. In the event that the metadata of selected asset(s) and the attributes of anticipated participant(s) in the new meeting record comply with the rule, control is transferred 608. Otherwise, in the event that the metadata of selected asset(s) and the attributes of anticipated participant(s) in the new meeting record do not comply with the rule, control is transferred 606. In some embodiments, the metadata (e.g., the tags and content properties) of the one or more assets that were identified in the record and the attributes of anticipated participant(s) that were identified in the record are compared to a rule. In some embodiments, a rule prescribes one or more conditions that the metadata of the one or more assets that were identified in the record and/or the attributes of anticipated participant(s) were identified in the record are to meet in order for the asset(s) to be permitted to be presented/screen shared with those meeting participants during a video conferencing meeting. For example, a rule can encapsulate the condition(s) prescribed by a regulation. In another example, a rule can be customized by or for a particular organization to ensure that their assets are not presented to/screen shared with meeting participants that do not meet their criteria.

A first example rule may prescribe that an asset that is tagged with a particular organization can only be presented to meeting participants that are employees of that same organization. A second example rule may prescribe that an asset that is tagged with a particular geographic area can only be presented to meeting participants that are of that same geographic area. A third example rule may prescribe that an asset that is tagged as sensitive financial information associated with a particular organization can only be presented to meeting participants that are executives at that same organization and/or providing a professional service (e.g., accounting) to that organization.

In some embodiments, the metadata of each and every asset identified in the record must meet the criteria outlined by the rule with respect to each meeting participant in order for the rule to be considered one that is complied with. Put another way, if even one asset or one meeting participant does not meet the criteria outlined by the rule, then the rule is considered to be violated.

At 606, data describing a violation of the rule is stored. If a rule is violated, data that describes the asset(s) and/or meeting participant(s) identified in the record that violate the rule are stored. For example, if a rule prescribes that all meeting participant(s) must have stored residence information that is within the geographic region that the assets are tagged with, then any meeting participant that does not live within the geographic region that the assets are tagged with can be identified as violating the rule.

At 608, whether there is at least one more rule to evaluate is determined. In the event there is at least one more rule to evaluate, control is returned to 604. Otherwise, in the event there are no more rules to evaluate, control is transferred to 610.

At 610, whether all rules have been complied with is determined. In the event that all rules have been complied with, control is transferred to 614. Otherwise, in the event fewer than all rules have been complied with, control is transferred to 612. If at least one rule is violated, then the meeting record will not be approved because the violation(s) would indicate that at least one anticipated meeting participant is not allowed to view at least one of the assets identified in the record.

At 612, data indicating that the new meeting record has not been approved is stored. Data describing the rule(s) violations associated with the meeting record may be stored and presented in a prompt to a user to update the record to conform to the violated rule(s).

At 614, data indicating that the new meeting record has been approved is stored. For an approved meeting record, the anticipated participants identified in the record are considered to be approved meeting participants of that meeting and also, the asset(s) identified in the record are considered to be approved asset(s) of that meeting. In some embodiments, even if the meeting record complies with all of the rule(s), the metadata of selected asset(s) and attributes of anticipated participant(s) in the new meeting record can be evaluated for risks or warnings. For example, if an asset that is identified in the record is not the latest version of the asset, then a warning can be presented with an approval of the record at a user interface.

Figure 7:
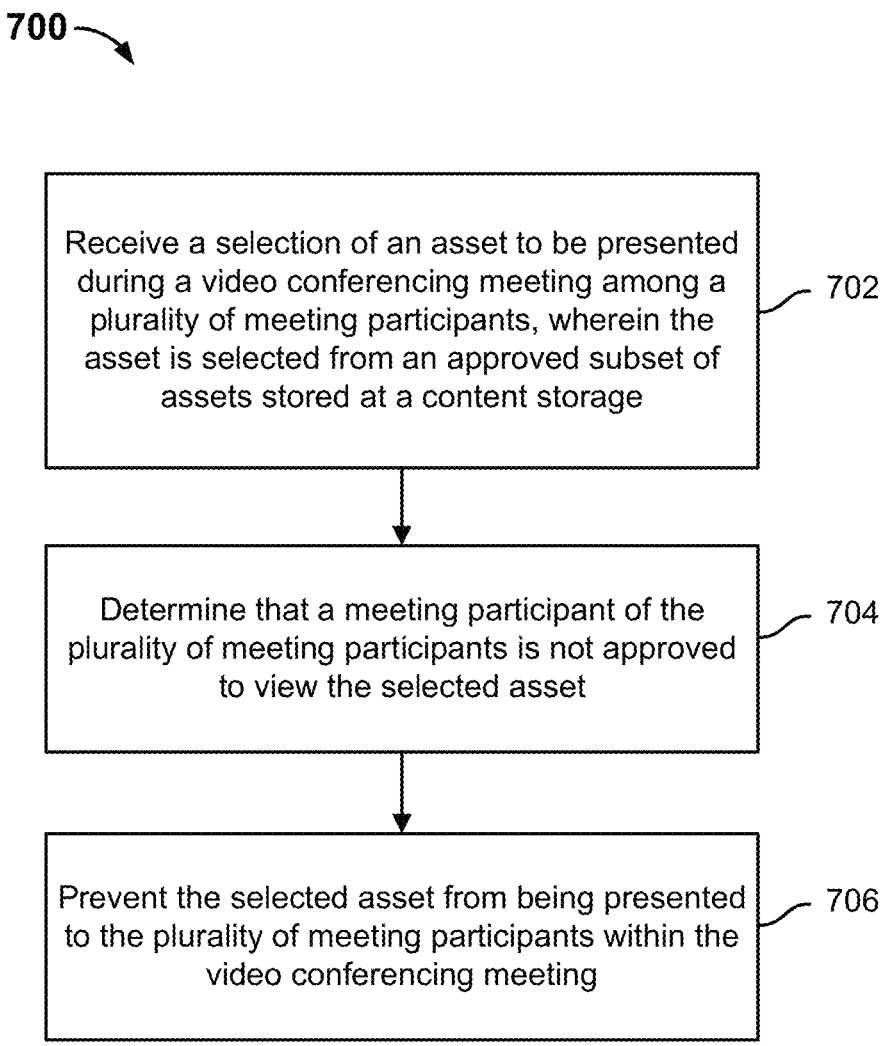
FIG. 7 is a flow diagram showing an embodiment of a process for providing in-meeting presentation management.

FIG. 7 is a flow diagram showing an embodiment of a process for providing in-meeting presentation management. In some embodiments, process 700 may be implemented, at least in part, on in-meeting presentation management server 102 of FIG. 1.

At 702, a selection of an asset to be presented during a video conferencing meeting among a plurality of meeting participants is received, wherein the asset is selected from an approved subset of assets stored at a content storage. The video conferencing meeting that corresponds to a previously generated and approved meeting record has started, in which the current meeting participants are connected to a virtual room via a respective instance of the video conferencing platform-specific application that is executing at each participant's device. Within each instance of the video conferencing platform-specific application that is executing at each participant's device, a custom application (e.g., a plugin) associated with an in-meeting presentation management service (e.g., provided by in-meeting presentation management server 102 of FIG. 1) is executing. In some embodiments, each instance of the custom application is broadcast or synchronized to the remote meeting participants' devices. In various embodiments, a native screen sharing function of the video conferencing platform-specific application is disabled for each meeting participant either by an administrative user of the organization-level account of the video conferencing platform or by a setting programmatically configured by the custom application. The result of disabling the native screen sharing function of the video conferencing platform-specific application is that the only screen sharing that can be enabled during the meeting is via the custom application.

During the meeting, the custom application may present different user interfaces to the meeting participants depending on their role within the meeting. In some embodiments, the custom application that is executing within the video conferencing platform-specific application that is signed into by a meeting "host" participant may be presented with the list of approved asset(s) that are identified in the meeting record but the custom application that is executing within the video conferencing platform-specific application that is signed into by a meeting "guest" participant may not be presented with the list of approved asset(s) that are identified in the meeting record. At some point during the meeting, a selection to present/screen share an approved asset by a meeting "host" participant is received via the host's custom application.

At 704, a meeting participant of the plurality of meeting participants is determined to not be approved to view the selected asset. Whether the selected asset can be presented/screen shared via the custom application for each current meeting participant is determined based on whether every current meeting participant matches an anticipated meeting participant that is identified in the meeting record. In some embodiments, the identifier that is used by each meeting participant that is currently in the meeting "room" is compared to the identifying information associated with anticipated meeting participants as described in the meeting record. If each current meeting participant's identifier matches at least a portion of the identifying information associated with anticipated meeting participants as described in the meeting record, then each current meeting participant is an anticipated meeting participant according to the meeting record and therefore, the asset can be presented to/screen shared with all the current meeting participants. However, if at least one current meeting participant's identifier does not match at least a portion of the identifying information associated with anticipated meeting participants as described in the meeting record, then fewer than all current meeting participants are anticipated meeting participants according to the meeting record and therefore, the asset cannot be presented to/screen shared with any of the current meeting participants.

At 706, the selected asset is prevented from being presented to the plurality of meeting participants within the video conferencing meeting. Because the (e.g., continued) presentation of/screen share of the selected approved asset to the current set of meeting participants fails to conform with the approved parameters of the approved meeting record and therefore potentially violates a regulation or risks the leak of sensitive information, the presentation of/screen share of the selected approved asset to all of the current meeting participants is dynamically prevented. In some embodiments, preventing the presentation of/screen share of the selected approved asset to all of the current meeting participants involves pausing the presentation of content associated with the asset, obfuscating or blurring the presentation of the content associated with the asset, and/or replacing the presentation of the content associated with the asset with a predetermined image/content within each current meeting participant's instance of the custom application. The prevention of the presentation/screen share of the selected asset will persist as long as the at least one current meeting participant's identifier does not match at least a portion of the identifying information associated with anticipated meeting participants as described in the meeting record. As will be described in further detail below, because meeting participants may dynamically join and leave the meeting, each event of a new meeting participant joining the meeting or an existing meeting participant leaving the meeting will trigger a determination of whether each current meeting participant's identifier matches at least a portion of the identifying information associated with anticipated meeting participants as described in the meeting record and when all current meeting participants match the information described in the meeting record, the selected approved asset is permitted to be presented/screen shared via the custom application for each meeting participant.

Figure 8:
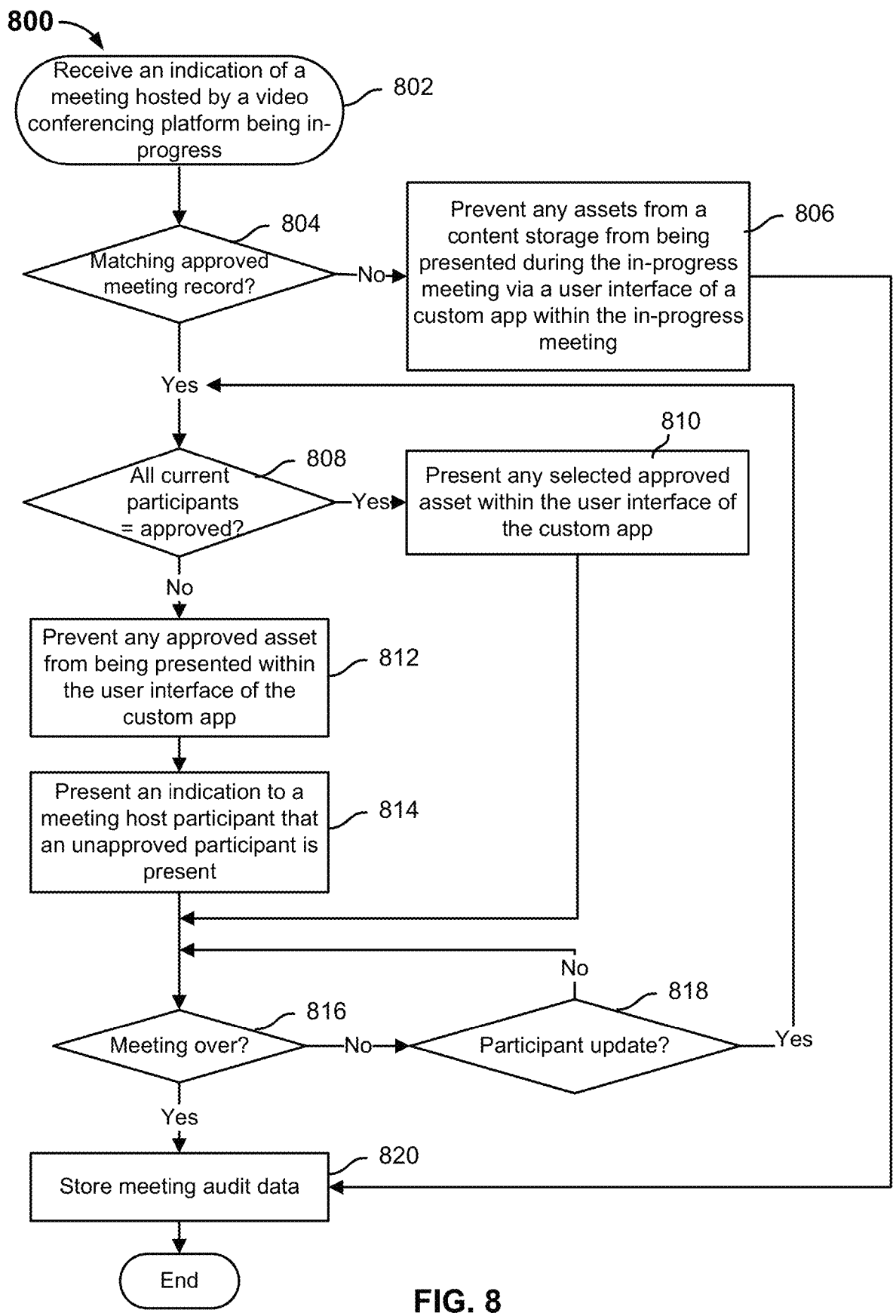
FIG. 8 is a flow diagram showing an example process for providing in-meeting presentation management in accordance with some embodiments.

FIG. 8 is a flow diagram showing an example process for providing in-meeting presentation management in accordance with some embodiments. In some embodiments, process 800 may be implemented, at least in part, on in-meeting presentation management server 102 of FIG. 1. In some embodiments, process 700 of FIG. 7 may be implemented, at least in part, using process 800.

At 802, an indication of a video conferencing meeting hosted by a video conferencing platform being in-progress is received.

At 804, whether the video conferencing meeting matches an approved meeting record is determined. In the event that the video conferencing meeting matches an approved meeting record, control is transferred to 808. Otherwise, in the event that the video conferencing meeting does not match an approved meeting record, control is transferred to 806. The identifier of the in-progress video conferencing meeting is compared against those of approved meeting records. If a match is found, then the meeting under consideration is an "approved" meeting. But if a match is not found, then the meeting under consideration is an "unapproved" meeting.

At 806, any assets from a content storage are prevented from being presented during the in-progress video conferencing meeting via a user interface of a custom application within the video conferencing meeting. In the event that the meeting is an unapproved meeting, then screen sharing of any assets from the content storage is not permitted via the custom application that is executing within the video conferencing platform-specific application.

At 808, whether all current meeting participants are approved meeting participants is determined. In the event that all current meeting participants are approved meeting participants, control is transferred to 810. Otherwise, in the event that fewer than all current meeting participants are approved meeting participants, control is transferred to 812. In the event that the meeting is an approved meeting, then the identifiers of all meeting participant(s) that have currently joined the meeting are compared against those of anticipated meeting participant(s) that are described in the approved meeting record. In some embodiments, the identifier of a meeting participant that has currently joined the meeting comprises the credentials (e.g., the login) with which the meeting participant had used to sign into the meeting.

At 810, any selected approved asset is presented via the user interface of the custom application within the video conferencing meeting. In the event that the identifiers of all meeting participant(s) that have currently joined the meeting match at least a portion of those of anticipated meeting participant(s) that are described in the approved meeting record, then screen sharing of any selected approved assets that are described in the approved meeting record is permitted via the custom application that is executing within the video conferencing platform-specific application. As mentioned above, any meeting participants of a "host" role can see the full list of approved asset(s) that are described in the meeting record and also can select any one thereof to start presenting/screen sharing with all the current meeting participants in the meeting.

Figure 9:
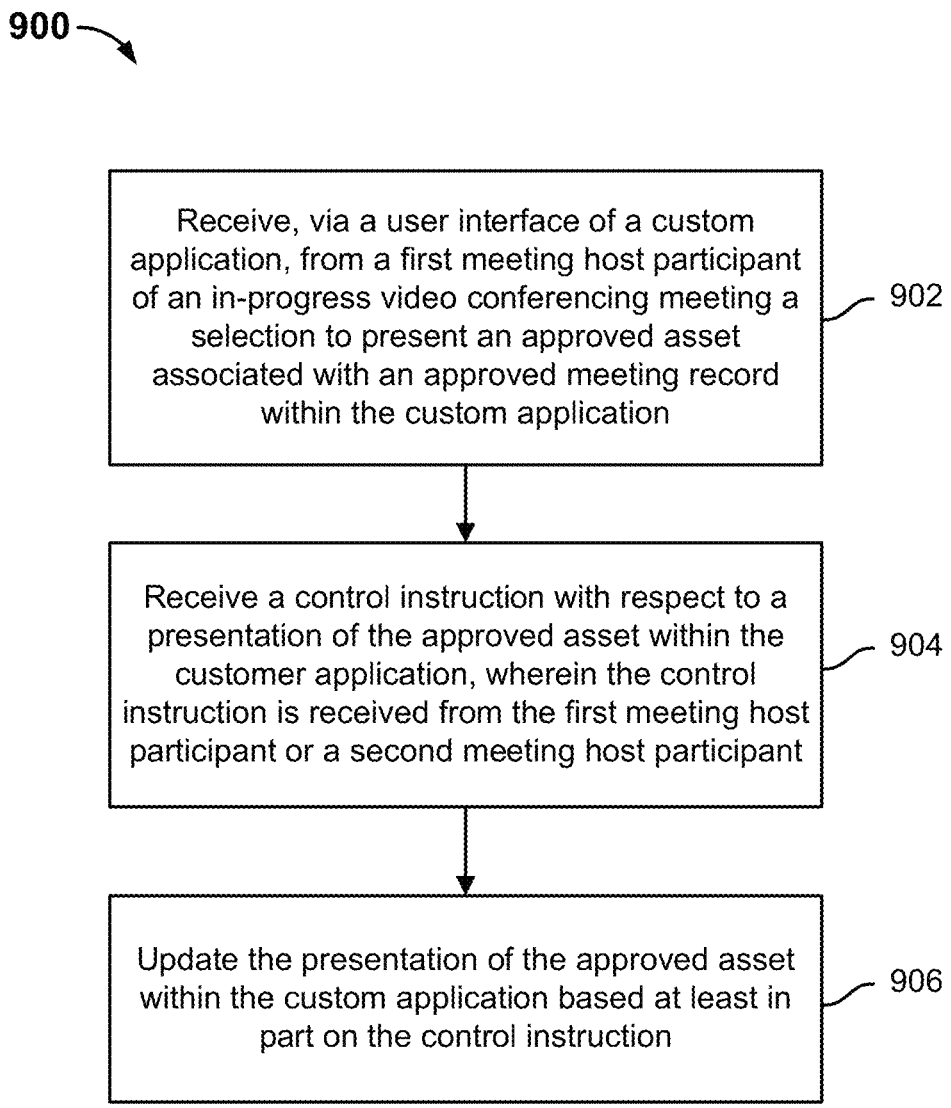
FIG. 9 is a flow diagram showing an example process for managing the presentation of an approved asset during a video conferencing meeting in accordance with some embodiments.

When a selected asset is presented/screen shared during the meeting, the respective custom application that is executing at each current meeting participant's device is presenting the content of that selected asset. For example, the content of the asset can be presented in a manner that is controlled by any one or more meeting participants of a "host" role. For instance, if the selected asset were a slide deck, then any of one or more meeting participants of a "host" role in the meeting can interact with their instance of the custom application to select which slide to present next. In another example, if the selected asset were a video, then any of one or more meeting participants of a "host" role in the meeting can interact with their instance of the custom application to control the playback of the video. FIG. 9, below, describes an example process of multiple meeting host participants controlling the presentation of a selected approved asset within the custom application.

Returning to FIG. 8, at 812, any approved asset is prevented from being presented via the user interface of the custom application within the video conferencing meeting. In the event that the identifiers of fewer than all of the meeting participant(s) that have currently joined the meeting match at least a portion of those of anticipated meeting participant(s) are described in the approved meeting record, then screen sharing of any of the approved assets (or any other asset from the content storage) is not permitted via the custom application that is executing within the video conferencing platform-specific application. Programmatically preventing an approved asset from being presented via the user interface of the custom application within the video conferencing meeting during the presence of an unapproved meeting participant will reduce the risk that unforeseen or undesirable meeting participants will gain access to content for which they are not permitted to view. Programmatically preventing an approved asset from being presented via the user interface of the custom application also obviates the need for manual determination of which meeting participants are currently in the meeting and whether subsequent actions that should be taken as a result of the current makeup of meeting participants.

In a first example, if no asset has been selected to be presented/screen shared, then preventing the screen sharing of any of the approved assets may involve preventing any approved asset from being selected for presentation by a meeting host participant (e.g., the list of approved assets can be shown to be unavailable to each host participant). In a second example, if an asset has been selected to be presented/screen shared, then preventing the screen sharing of any of the approved assets may involve pausing the current presentation of the approved asset, obfuscating/blurring the presentation of the approved asset to render the presentation unreadable, and/or replacing the presentation of the approved asset with predetermined content (e.g., a predetermined image) via the custom application for each current meeting participant.

At 814, an indication is presented to a meeting host participant that an unapproved participant is present. Furthermore, an indication that identifies the one or more current meeting participants that do not match anticipated meeting participants as described in the approved meeting record is presented at the instance(s) of the custom application that are executing at the device(s) of the meeting host participant(s) so that they are aware of which meeting participants do not conform to the approved meeting record.

At 816, whether the video conferencing meeting is over is determined. In the event that the video conferencing meeting is over, control is transferred to 820. Otherwise, in the event that the video conferencing meeting is not over, control is transferred to 818.

At 818, whether an update has occurred with respect to the current meeting participants is determined. In the event that the update has occurred with respect to the current meeting participants, control is returned to 808. Otherwise, in the event that the update has not occurred with respect to the current meeting participants, control is transferred to 816. An update with respect to the current meeting participants includes an event in which a current meeting participant has left the meeting or an event in which a new meeting participant has joined the meeting. Either event would warrant a re-evaluation at 808 of whether the current meeting participants all match anticipated meeting participant descriptions in the approved meeting record. For example, if all meeting participant(s) that were unapproved given the meeting record leave the meeting, then the presentation of any of the approved assets could be permitted to start or resume (at 810) during the meeting. In another example, if a new meeting participant is unapproved given the meeting record joins the meeting, then the presentation of any of the approved assets is prevented (at 812).

At 820, audit data corresponding to the video conferencing meeting is stored. In some embodiments, metrics such as which asset is shared, which portion of an asset is shared, and for how long during the meeting is tracked as audit data associated with the meeting. For example, the start and end timestamps of when each portion of each asset is shared via the custom application during the meeting is tracked. In some embodiments, which meeting participants joined the meeting, when the meeting participants joined the meeting, and which of the meeting participants were presented with which assets (or portions thereof) are also tracked as audit data associated with the meeting. In one example, for each length of time that an approved asset is presented/screen shared, the custom application tracks various metrics depending on the type of asset that is shared. For page-based content (e.g., Microsoft PowerPoint® slides, PDF, Google Docs, etc.), the page number, when the page was shown during the meeting, and time spent on that page along with the meeting participants at the time of the page view are recorded. For timeline-based content (e.g., video), the start time and duration along with meeting participants are recorded and placed in the meeting store in order to be combined with meeting recording segments and transcript segments for further processing. FIG. 9, below, describes an example process of downstream analysis that can be performed on audit data associated with one or more historical meetings.

FIG. 9 is a flow diagram showing an example process for managing the presentation of an approved asset during a video conferencing meeting in accordance with some embodiments. In some embodiments, process 900 may be implemented, at least in part, on in-meeting presentation management server 102 of FIG. 1.

Process 900 is an example that illustrates the seamless and cooperative process of multiple meeting host participants potentially controlling the presentation of the same approved asset within a video conferencing meeting corresponding to an approved meeting record. Typically, only the meeting host participant that had initially selected to screen share content can manipulate the presentation of the content during a video conferencing meeting. In contrast, in some embodiments and as described in process 900, any of one or more meeting participants with a "host" role can each manipulate the presentation of the content of a selected approved asset via the custom application embedded in the video conferencing platform-specific application during a video conferencing meeting, even if only one of the meeting host participants had initiated the presentation/screen share of the asset.

At 902, a selection to present an approved asset associated with an approved meeting record within a custom application is received from a first meeting host participant of an in-progress video conferencing meeting via a user interface of the custom application. In some embodiments, the video conferencing platform that is hosting the in-progress video conferencing meeting recognizes a role associated with each participant with respect to a particular meeting. For example, the "role" with respect to a meeting may be either "host" or "guest." In a specific example, there are at least two types of "host" roles: a "primary host" (or sometimes referred to as just "host") and a "secondary host" (or sometimes referred to as a "co-host"). For example, the role of a meeting participant can be identified in advance in the meeting record and/or in-meeting, and a meeting host participant can designate one or more other meeting participants as additional meeting hosts. Depending on the type of video conference platform that is to host the meeting and the configuration(s) of the custom application, a meeting participant with a "host" role may have different levels of control with respect to managing the meeting. For instance, the meeting participant in the "primary" host role may be permitted to view the list of the available content to present, select a piece of content to screen share/present during the meeting, control/manipulate the presentation of the content, and start and/or end the meeting. Also, for instance, the meeting participant in the "secondary" host role may also be permitted to view the list of the available content to present, select a piece of content to screen share/present during the meeting, control/manipulate the presentation of the content, but not start and/or end the meeting. In contrast, a meeting participant with a "guest" role may not be permitted to view the list of the available content to present, select a piece of content to screen share/present during the meeting, control/ manipulate the presentation of the content, or start/end the meeting.

During a video conferencing meeting that corresponds to an approved meeting record (e.g., as determined using step 804 of process 800 of FIG. 8), in some embodiments, the user interface of the custom application that is presented to each meeting host participant includes a list of approved asset(s) for that meeting. A first meeting host participant can initiate the presentation of an approved asset to all of the current meeting participants by selecting the asset from the list of approved asset(s) that is presented within the user interface of the custom application.

At 904, a control instruction with respect to a presentation of the approved asset within the customer application is received, wherein the control instruction is received from the first meeting host participant or a second meeting host participant. In some embodiments, even though the presentation of the selected asset was initiated by a first meeting host participant, previews of the content associated with the asset and/or controls to manipulate the presentation of the asset can be presented within the user interface of the custom application for each of the one or more meeting host participants.

At 906, the presentation of the approved asset is updated based at least in part on the control instruction. In response to a control instruction to manipulate/control the presentation of the selected asset that is received from the instance of the custom application that is presented to any meeting host participant, the presentation of the content of the asset to all of the current meeting participants is updated accordingly within the custom application. In a first example, if an approved asset comprising a multiple-page/slide document is selected by a first host to present during a meeting, then all current meeting participants can see the current page/ slide of the document that is being presented through the custom application but only the host participant(s) can preview the other pages/slides of the document that are not currently being presented as well as controls to navigate/ manipulate the presentation to show the other pages/slides. As such, even if the first host had initially selected to present the document, then any of the other hosts (in addition to the first host) can select to share a specific portion (page/slide) of the document within the custom application.

As described in process 900, two or more meeting host participants in a video conferencing meeting can share control of the presentation of the same asset within the custom application in a manner that is transparent to the guest participants of that meeting. This seamless co-presentation feature may enable remote co-hosts to cooperatively manipulate a presentation of content during a videoconferencing meeting without needing to manually delegate control of the presentation of the content among each other during the meeting.

Figure 10:
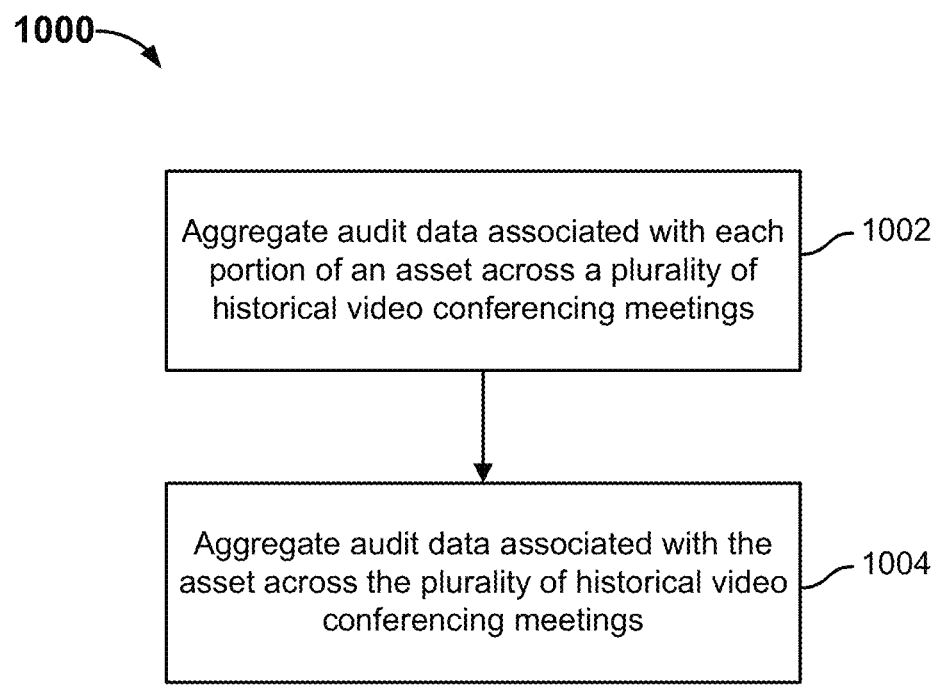
FIG. 10 is a flow diagram showing an example process for aggregating audit data associated with an asset across historical video conferencing meetings in accordance with some embodiments.

FIG. 10 is a flow diagram showing an example process for aggregating audit data associated with an asset across historical video conferencing meetings in accordance with some embodiments. In some embodiments, process 1000 may be implemented, at least in part, on in-meeting presentation management server 102 of FIG. 1.

At 1002, audit data associated with each portion of an asset is aggregated across a plurality of historical video conferencing meetings. As mentioned above, because in accordance with various embodiments described above, approved assets for a video conferencing meeting are only able to be shared via a custom application that is executing/ embedded within a video conferencing platform-specific application, the custom application can track audit data (metrics) associated with not only which asset is presented/ screen shared within the custom application during a meeting but also which portion of a multiple-portioned (e.g., a multiple-paged or a timeline-based) asset. For example, the custom application can track (for each meeting) metrics associated with each page/slide of a document/slide asset and/or the custom application can track metrics associated with segments of a video asset. Examples of metrics include the length of time (e.g., as defined by start and end timestamps within the meeting) for which an asset portion (e.g., a particular page or a particular slide) was shared, the meeting participants that were present during the time that an asset portion was shared, and/or whether an unapproved meeting participant joining had interrupted the sharing of an asset portion during a meeting. The metrics that have been tracked across historical video conferencing meetings during which an asset portion was shared can be aggregated to determine aggregated analytics for that asset portion (e.g., the aggregated number of hours that the asset portion was shared, the aggregated number of unique meeting participants that had viewed the asset portion, etc.).

In some embodiments, at least some of the historical video conferencing meetings are recorded and the segments of the video recordings during which each asset portion was shared according to the metrics can be analyzed. For example, the video frames, audio segments, text transcripts, and which meeting participants were present during each such video segment can be analyzed to determine what was said, sentiments expressed by the participants, the quality of the presentation, etc.

A 1004, audit data associated with the asset is aggregated across the plurality of historical video conferencing meetings. Similarly, the custom application can track (for each meeting) metrics associated with entire assets. For example, the custom application can track (for each meeting) metrics associated with each document/slide-based asset and/or the custom application can track metrics associated with a video-based asset. Examples of metrics include the length of time (e.g., as defined by start and end timestamps within the meeting) for which (any portion of) an asset was shared, the meeting participants that were present during the time that (any portion of) the asset was shared, and/or whether an unapproved meeting participant joining had interrupted the sharing of (any portion of) the asset during a meeting. The metrics that have been tracked across historical video conferencing meetings during which an asset was shared can be aggregated to determine aggregated analytics for that asset (e.g., the aggregated number of hours that the asset was shared, the aggregated number of unique meeting participants that had viewed the asset, etc.).

Similarly, as described above, in some embodiments, at least some of the historical video conferencing meetings are recorded and the segments of the video recordings during which (any portion of) an asset was shared according to the metrics can be analyzed. For example, the video frames, audio segments, text transcripts, and which meeting participants were present during each such video segment can be analyzed to determine what was said, sentiments expressed by the participants, the quality of the presentation, etc.

In some embodiments, the aggregated asset-related metrics as described by process 1000 can be generated into reports that are subject to a review process. For example, after a meeting, a reviewer (a user with the ability to review recorded meetings) or a programmatic review process may analyze the aggregated asset-related metrics as well as who prepared, approved, and presented the assets. In some embodiments, the reviewer may input comments and/or feedback on recorded meetings and potentially, modify the permissions associated with the assets that had been shared via the custom application during the recorded meetings.

Figure 11:
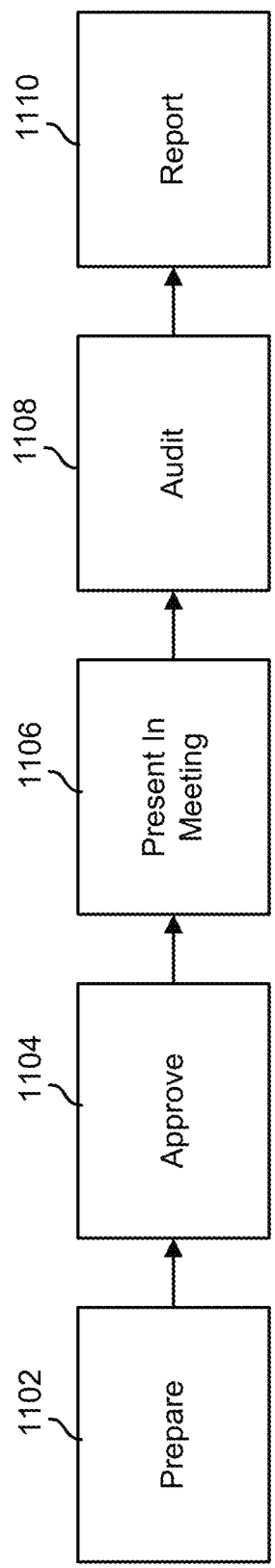
FIG. 11 is a diagram showing a schematic diagram of preparing for, performing, and reviewing in-meeting presentation management in accordance with some embodiments.

FIG. 11 is a diagram showing a schematic diagram of preparing for, performing, and reviewing in-meeting presentation management in accordance with some embodiments. At 1102, a meeting record corresponding to a future video conferencing meeting is prepared using a process such as, for example, process 400 of FIG. 4. At 1104, the meeting record is approved using an approval process such as, for example, process 600 of FIG. 6. At 1106, during the video conferencing meeting corresponding to the meeting record, the presentation of selected approved asset(s) in accordance with the meeting record is controlled such that the asset(s) are only permitted to be presented so long as the current set of participants in the meeting match the anticipated meeting participants as described in the meeting record. For example, step 1106 may be implemented using a process such as process 800 of FIG. 8 or process 900 of FIG. 9. At 1108, metrics related to the presentation of approved assets during the now completed meeting are audited using a process such as process 900 of FIG. 9. At 1110, the metrics related to the presentation of approved assets during the now completed meeting and other historical meetings are reviewed/reported. For example, step 1110 may be implemented using a process such as process 1000 of FIG. 10.

Figure 12A:
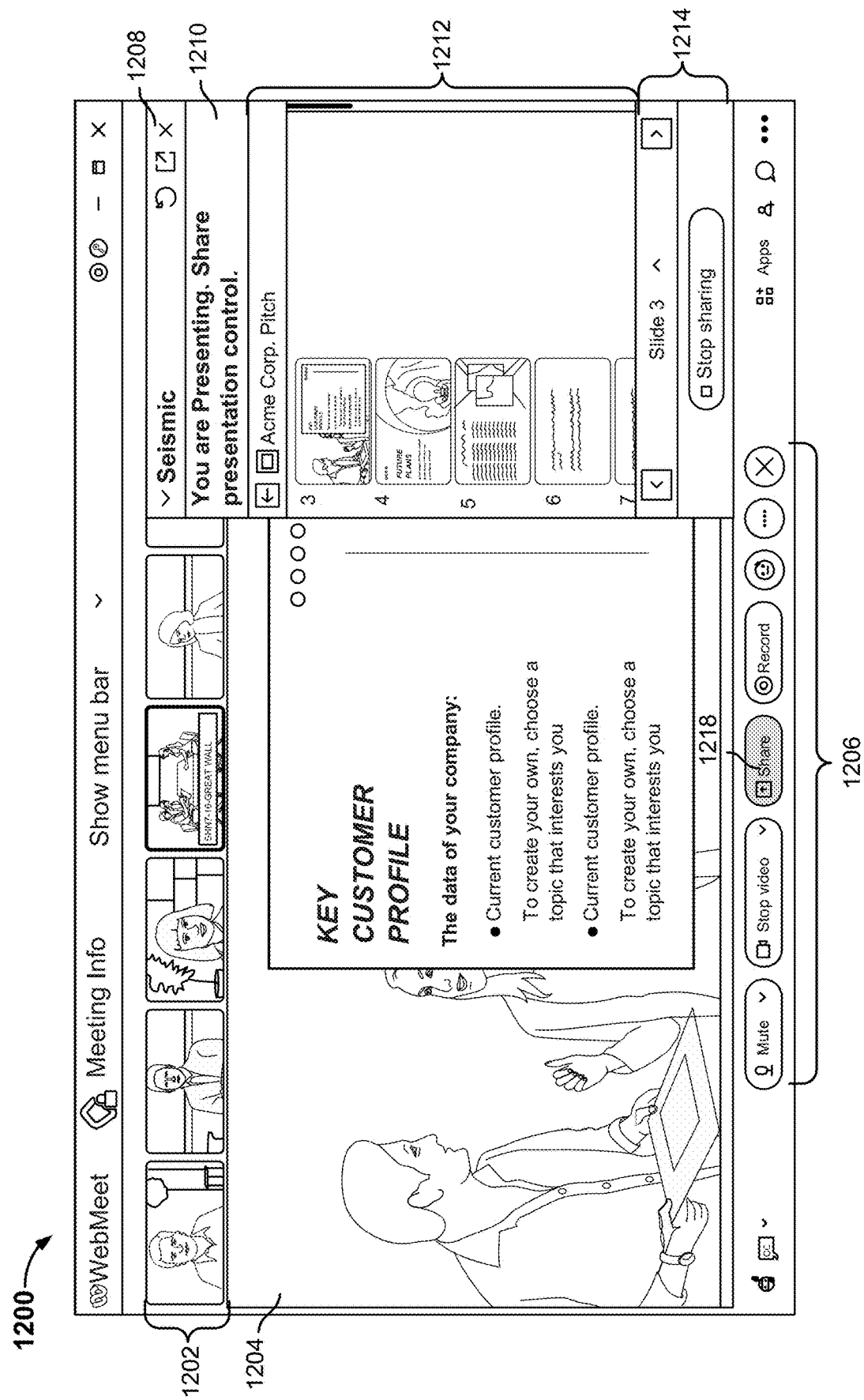
FIGS. 12A and 12B are example user interfaces of a video conferencing platform-specific application with a custom application for providing in-meeting presentation management that are presented to a meeting participant with a "primary host" role during a meeting.
Figure 12B:
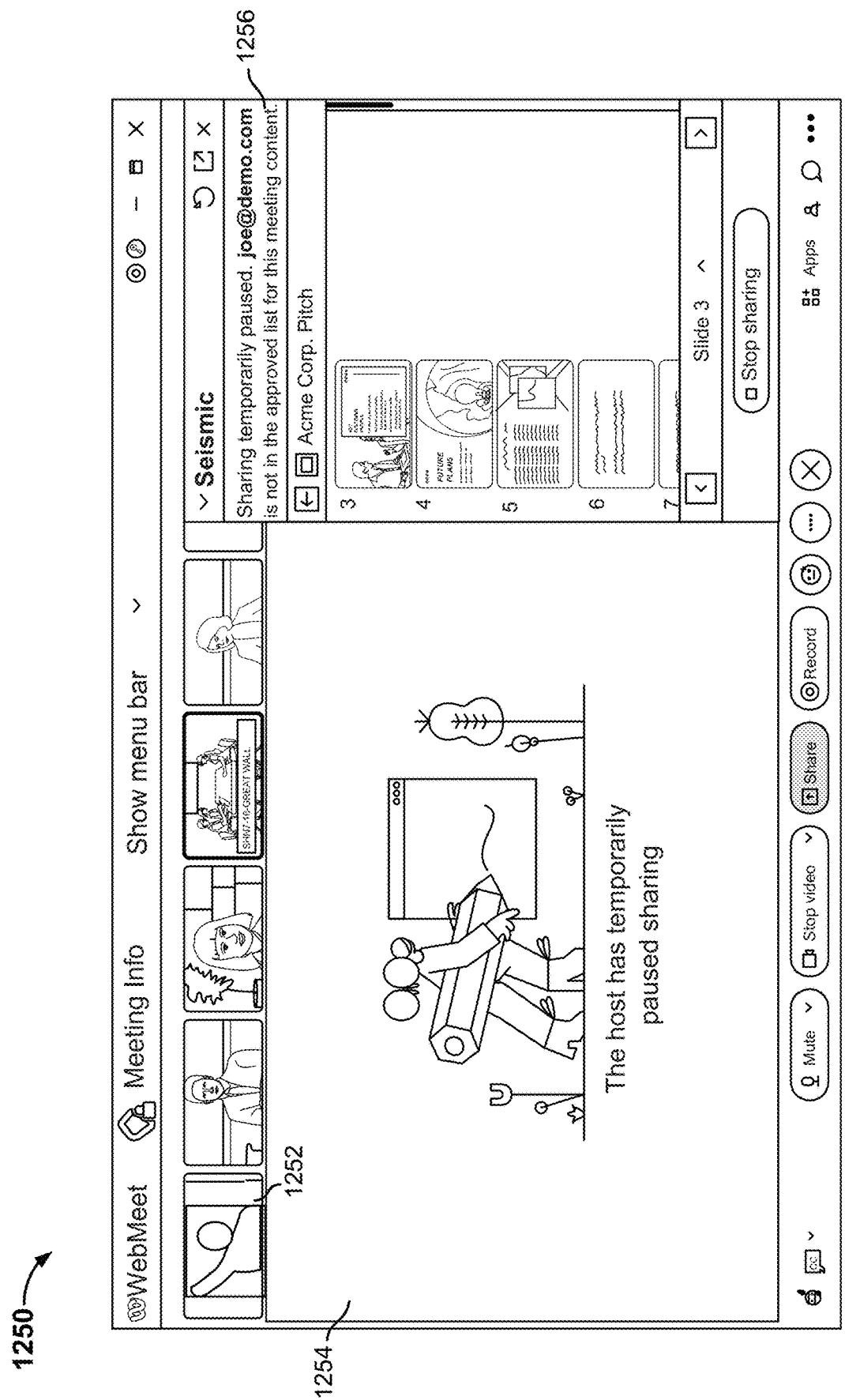

FIGS. 12A and 12B are example user interfaces of a video conferencing platform-specific application with a custom application for providing in-meeting presentation management that are presented to a meeting participant with a "primary host" role during a meeting.

In the example of FIG. 12A, user interface 1200 comprises the user interface of a video conferencing platform-specific application associated with the platform named "WebMeet." Participant feeds 1202 shows a respective thumbnail video feed or predetermined image corresponding to each current meeting participant that is currently in the meeting (the virtual room associated with the meeting). The video conferencing platform-specific application includes native meeting controls 1206. Embedded within the video conferencing platform-specific application is custom application 1208 for providing in-meeting presentation management. Note that native screen share button 1218 of the video conferencing platform-specific application is grayed out because the function has been disabled (e.g., due to an administrator's configuration or by custom application 1208). As such, only custom application 1208 can control the content that is presented to all current meeting participants in presentation space 1204 within the video conferencing platform-specific application.

In FIG. 12A, the meeting participant that has signed into the video conferencing platform-specific application and/or custom application is determined to be associated with a "primary host" role in the meeting. As such, the user interface of custom application 1208 generated for the "primary host" in FIG. 12A includes indication 1210 that the primary host is currently presenting a previously selected approved asset (a slide deck titled "Acme Corp. Pitch") for the meeting according to an approved meeting record. The various slides and corresponding slide numbers of the slide deck titled "Acme Corp. Pitch" are previewed in preview 1212 portion of custom application 1208 so that the primary host can view that Slide 3 is currently presented/screen shared with all current meeting participants in presentation space 1204 and also see previews of other slides within the same slide deck. Furthermore, custom application controls 1214 allow the primary host to navigate/manipulate/control the presentation to display later or earlier slides of the "Acme Corp. Pitch" slide deck in presentation space 1204 or to stop sharing the current slide deck altogether.

In the example of FIG. 12A, custom application 1208 is configured to allow slides of the "Acme Corp. Pitch" slide deck to be screen shared to all of the current meeting participants within presentation space 1204 because (e.g., as described in process 900 of FIG. 9) every current meeting participant matches the anticipated meeting participants that are described in the approved meeting record.

However, a new meeting participant associated with the identifier of joe@a.com that does not match the anticipated meeting participants that are described in the approved meeting record joins the meeting. For example, a new participant associated with email joe@a.com joins the meeting by selecting a URL associated with the meeting and inputting his email as his identifier for the meeting. As a result of the new meeting participant associated with the identifier of joe@a.com not matching the anticipated meeting participants that are described in the approved meeting record, the presentation of the slide deck titled "Acme Corp. Pitch" is prevented from appearing within presentation space 1204.

FIG. 12B shows an example user interface of a video conferencing platform-specific application for the primary host when the presentation of a selected approved asset within the custom application is paused in response to the addition of a new, unapproved meeting participant to the meeting. User interface 1250 comprises an example of an update to user interface 1200 of FIG. 12A after the new meeting participant associated with the identifier of joe@a.com, who is determined to be an unapproved meeting participant, joins the meeting. As shown in the example of FIG. 12B, after the new meeting participant associated with the identifier of joe@a.com joins the meeting, joe@a.com's video feed 1252 appears with those of other current meeting participants and furthermore, the new meeting participant is determined to not be an approved, anticipated meeting participant with respect to the meeting. In response to the detected presence of participant joe@a.com, the custom application of a video conferencing platform-specific application pauses the presentation of the slide deck titled "Acme Corp. Pitch" within presentation space 1254 and instead replaces the presentation within presentation space 1254 with that of a predetermined image (e.g., an image that is labeled with "The host has temporarily paused sharing.") Put another way, so long as unapproved participant joe@a.com is present within the meeting, the presentation/screen share of the approved slide deck titled "Acme Corp. Pitch" is paused for all the meeting participants such that none of the meeting participants (including participant joe@a.com) can view any slides from Acme Corp. Pitch. Furthermore, during this pause, the user interface of the custom application further provides, for the primary host, the reason for the content sharing pause, which is indication 1256 stating that the participant associated with joe@a.com is not on the approved list of anticipated meeting participants for this meeting. If/when unapproved participant joe@a.com leaves the meeting, the presentation of the slide deck titled "Acme Corp. Pitch" can resume within presentation space 1254.

Figure 13A:
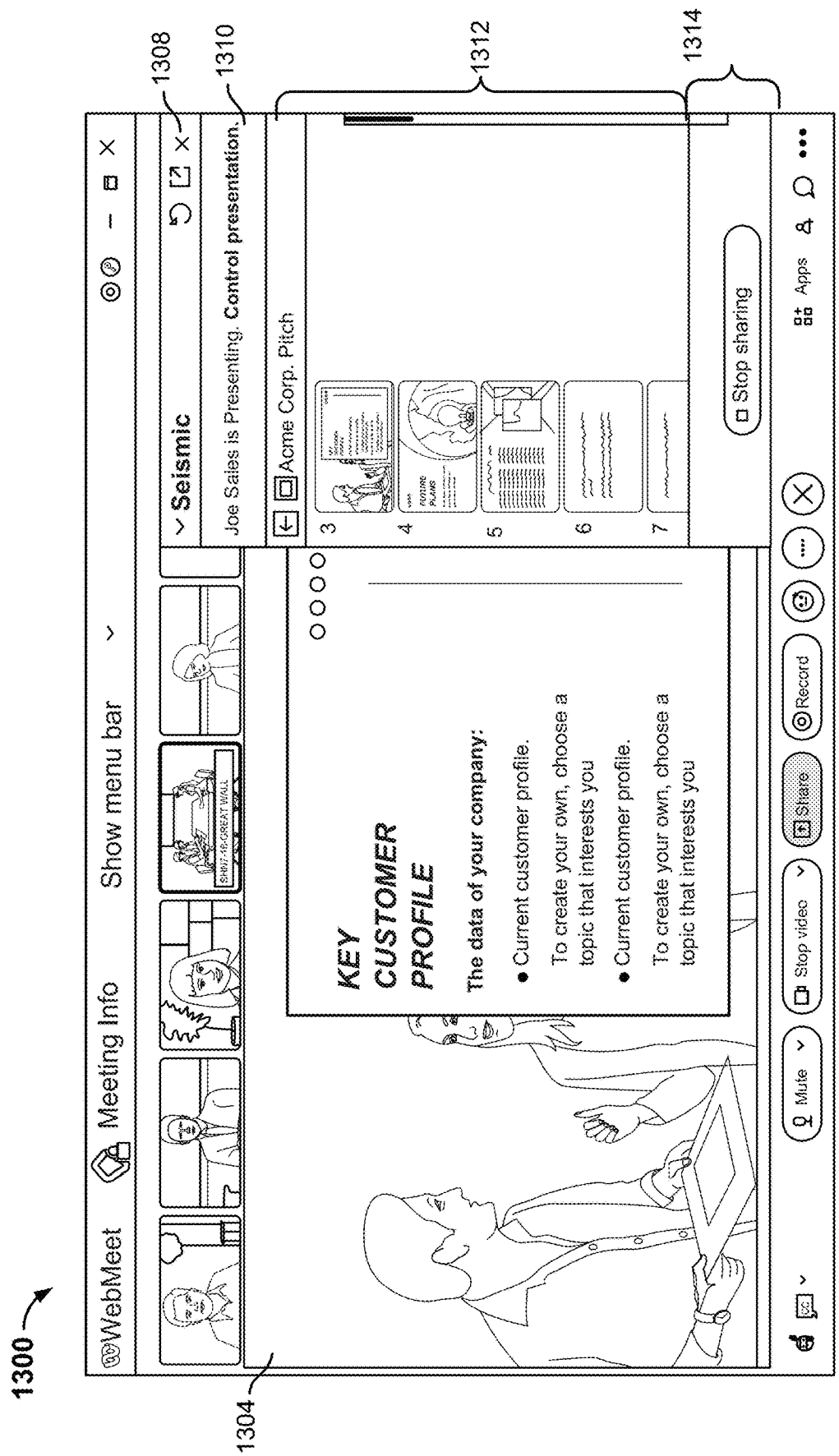
FIGS. 13A and 13B are example user interfaces of a video conferencing platform-specific application with a custom application for providing in-meeting presentation management that are presented to a meeting participant with a "secondary host" role during a meeting.
Figure 13B:
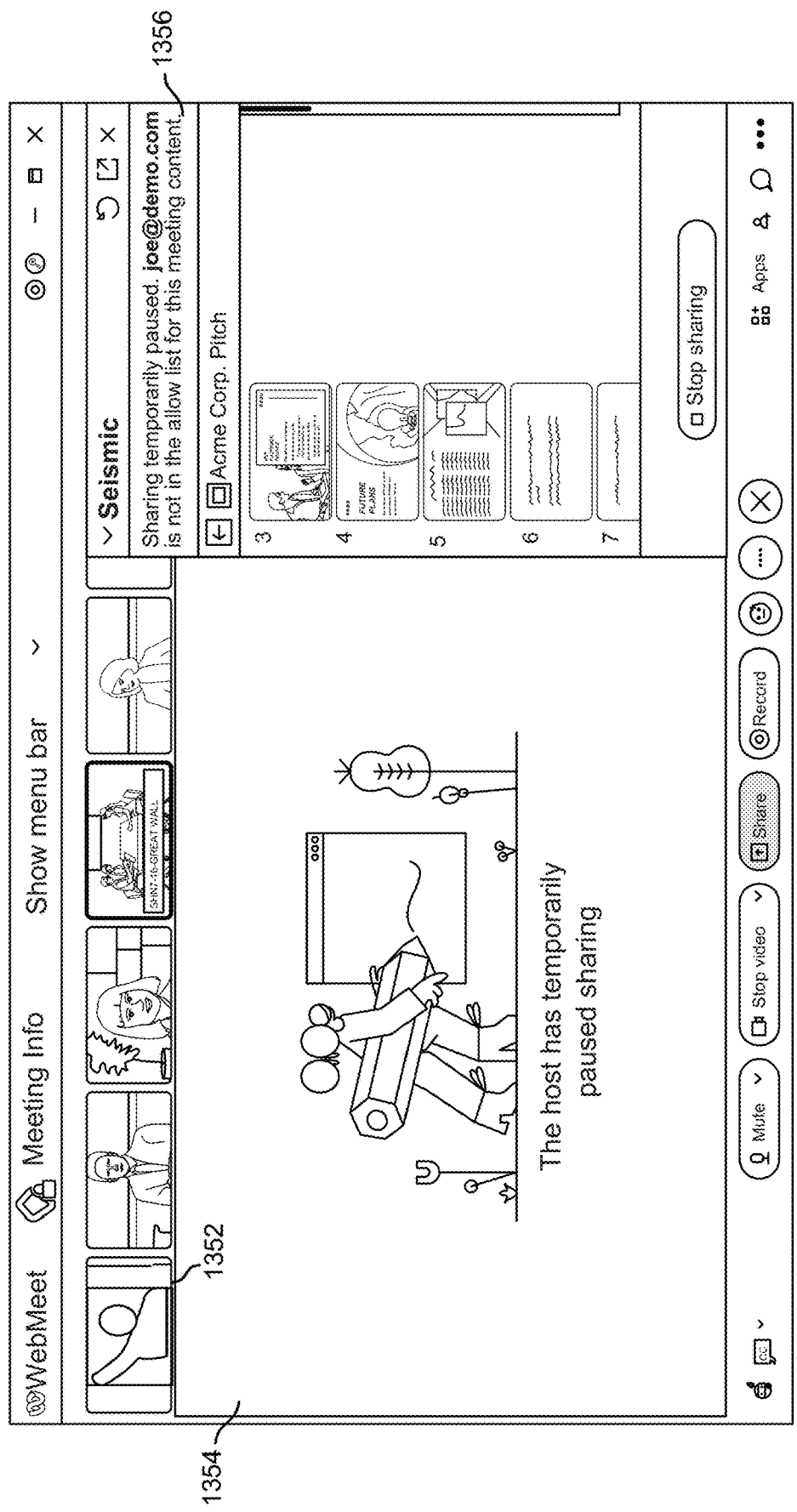

FIGS. 13A and 13B are example user interfaces of a video conferencing platform-specific application with a custom application for providing in-meeting presentation management that are presented to a meeting participant with a "secondary host" role during a meeting.

User interface 1300 of FIG. 13A is similar to user interface 1200 of FIG. 12A. Similar to user interface 1200 of FIG. 12A, user interface 1300 also includes a disabled (grayed out) native screen sharing button on the user interface of the video conferencing platform-specific application. User interface 1300 also includes custom application 1308, which provides indication 1310 that states that another host ("Joe Sales") is currently presenting the selected approved asset of the slide deck "Acme Corp. Pitch." Furthermore, indication 1310 also provides selectable text "Control Presentation" that if selected, would allow the secondary host viewing user interface 1300 to directly navigate/manipulate/control the presentation (using controls that would appear within controls 1314) to display later or earlier slides of the "Acme Corp. Pitch" slide deck in presentation space 1304. Even though in user interface 1300, the secondary host is not directly controlling the presentation of the slide deck "Acme Corp. Pitch," custom application 1308 that is presented to the secondary host also displays the various slides and corresponding slide numbers of the slide deck titled "Acme Corp. Pitch" in preview 1312. Furthermore, custom application controls 1314 allow the secondary host to stop sharing the current slide deck altogether.

In the example of FIG. 13A, custom application 1308 is configured to allow slides of the "Acme Corp. Pitch" slide deck to be screen shared to all of the current meeting participants within presentation space 1304 because (e.g., as described in process 900 of FIG. 9) every current meeting participant matches the anticipated meeting participants that are described in the approved meeting record.

When a new meeting participant associated with the identifier of joe@a.com that does not match the anticipated meeting participants that are described in the approved meeting record joins the meeting, the presentation of the slide deck titled "Acme Corp. Pitch" is prevented from appearing within presentation space 1304.

FIG. 13B shows an example user interface of a video conferencing platform-specific application for the secondary host when the presentation of a selected approved asset within the custom application is paused in response to the addition of a new, unapproved meeting participant to the meeting. User interface 1350 comprises an example of an update to user interface 1300 of FIG. 13A after the new meeting participant associated with the identifier of joe@a.com, who is determined to be an unapproved meeting participant, joins the meeting. As shown in the example of FIG. 13B, after the new meeting participant associated with the identifier of joe@a.com joins the meeting, joe@a.com's video feed 1352 appears with those of other current meeting participants and furthermore, the new meeting participant is determined to not be an approved, anticipated meeting participant with respect to the meeting. In response to the detected presence of participant joe@a.com, the custom application of the video conferencing platform-specific application pauses the presentation of the slide deck titled "Acme Corp. Pitch" within presentation space 1354 and instead replaces the presentation within presentation space 1354 with that of a predetermined image (e.g., an image that is labeled with "The host has temporarily paused sharing.") Put another way, so long as unapproved participant joe@a.com is present within the meeting, the presentation/screen share of the approved slide deck titled "Acme Corp. Pitch" is paused for all the meeting participants such that none of the meeting participants (including participant joe@a.com) can view any slides from Acme Corp. Pitch. Furthermore, during this pause, the user interface of the custom application further provides, for the secondary host, the reason for the content sharing pause, which is indication 1356 stating that the participant associated with joe@a.com is not on the approved list of anticipated meeting participants for this meeting. If/when unapproved participant joe@a.com leaves the meeting, the presentation of the slide deck titled "Acme Corp. Pitch" can resume within presentation space 1354.

Figure 14A:
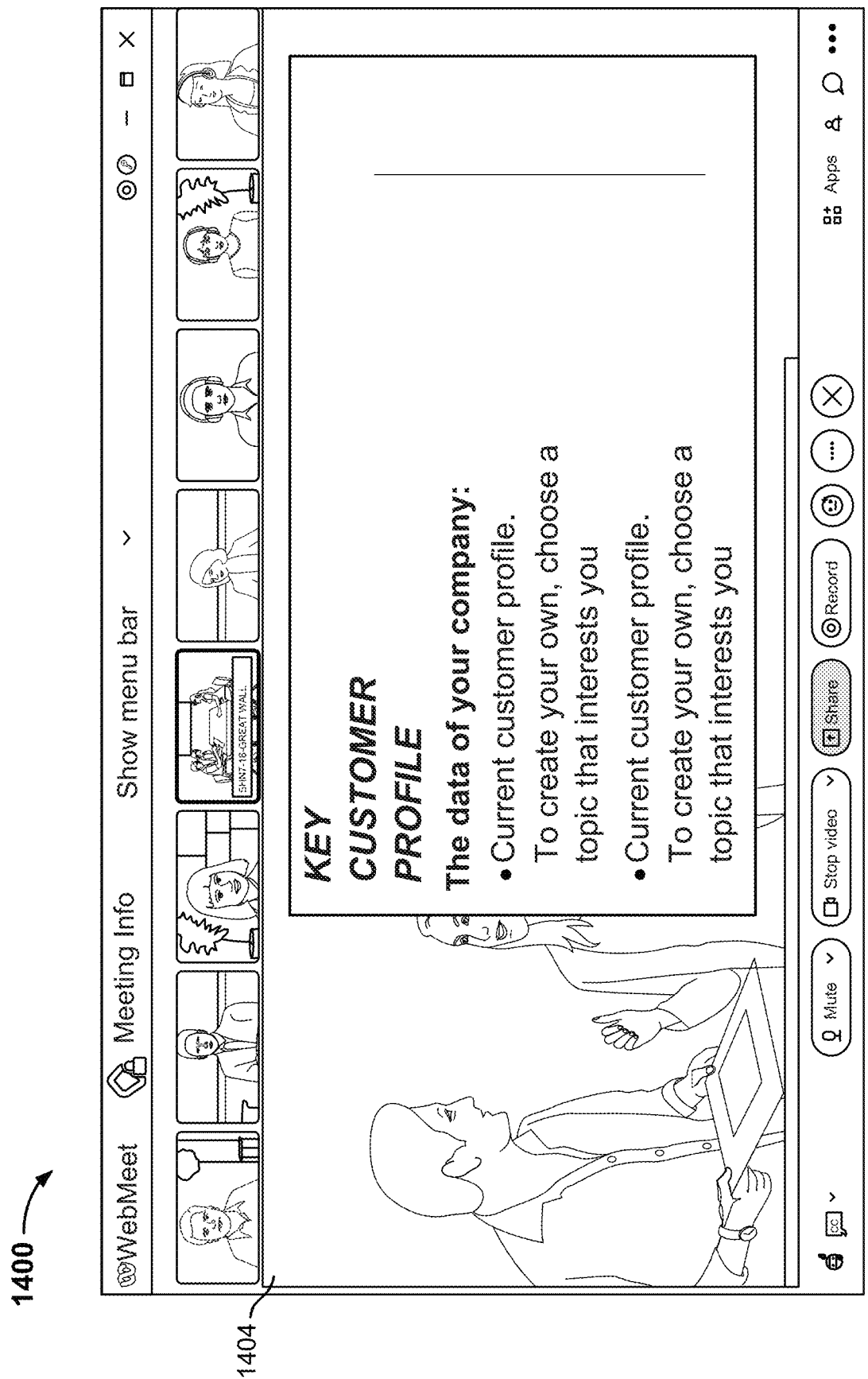
FIGS. 14A and 14B are example user interfaces of a video conferencing platform-specific application with a custom application for providing in-meeting presentation management that are presented to a meeting participant with a "guest" role during a meeting.
Figure 14B:
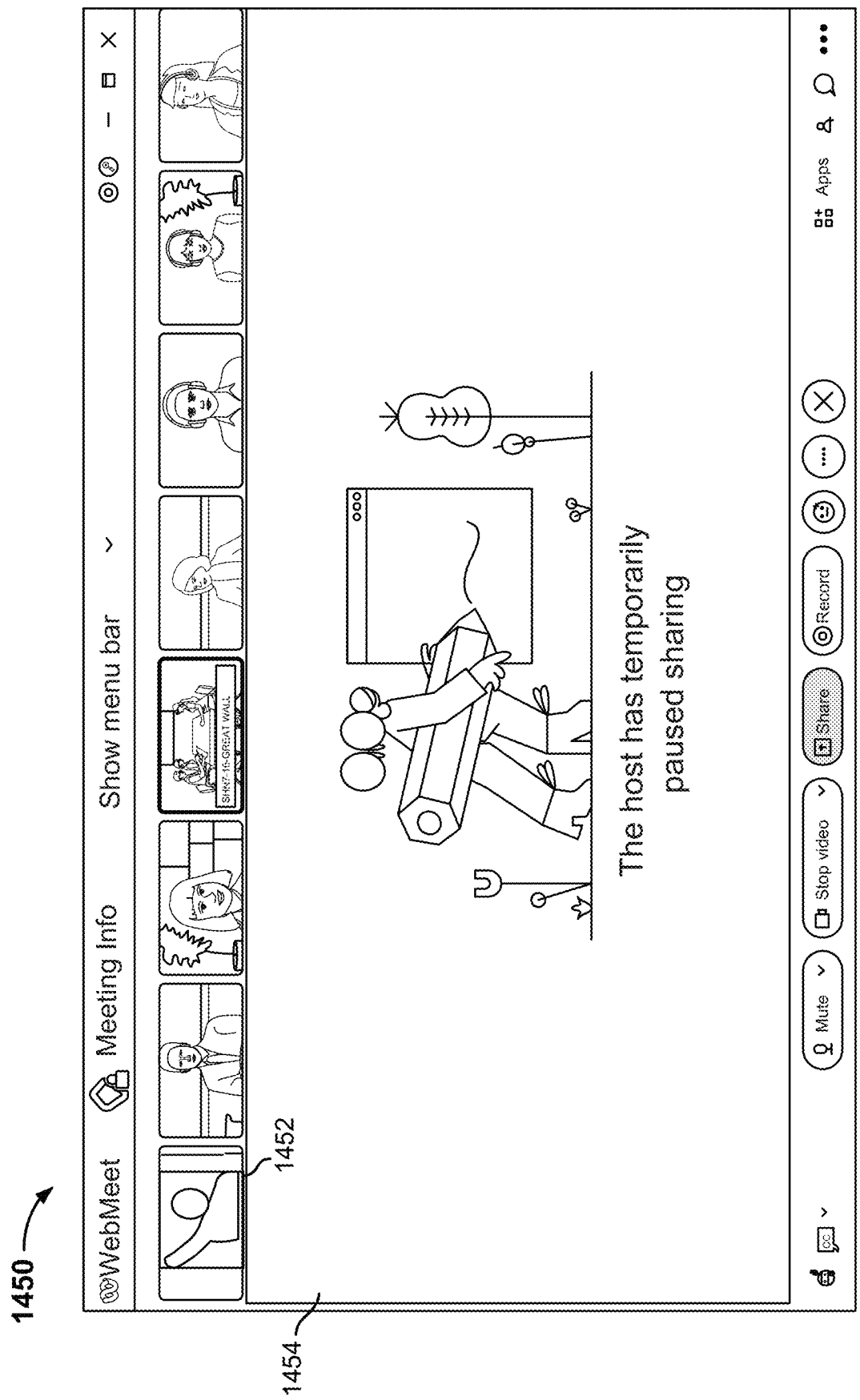

FIGS. 14A and 14B are example user interfaces of a video conferencing platform-specific application with a custom application for providing in-meeting presentation management that are presented to a meeting participant with a "guest" role during a meeting.

In contrast to user interface 1200 of FIG. 12A that was displayed for a primary host and user interface 1300 of FIG. 13A that was displayed for a secondary host, user interface 1400 of FIG. 14A includes only presentation space 1404 at which content of a selected asset that is presented by a (primary or secondary) host in the meeting is shared with all of the meeting participants. Unlike user interface 1200 of FIG. 12A that was displayed for a primary host and user interface 1300 of FIG. 13A that was displayed for a secondary host, user interface 1400 does not include the list of approved assets to be presented during the meeting or a preview of portions of a selected asset that is being presented within the user interface of a custom application that is provided for in-meeting presentation management. As such, the meeting guest participant has no control over which asset to present/screen share and how during the meeting.

In the example of FIG. 13A, a slide of the approved asset of the slide deck "Acme Corp. Pitch" is permitted to be screen shared to all of the current meeting participants within presentation space 1404 of user interface 1400 because (e.g., as described in process 900 of FIG. 9) every current meeting participant matches the anticipated meeting participants that are described in the approved meeting record.

When a new meeting participant associated with the identifier of joe@a.com that does not match the anticipated meeting participants that are described in the approved meeting record joins the meeting, the presentation of the slide deck titled "Acme Corp. Pitch" is prevented from appearing within presentation space 1404.

FIG. 14B shows an example user interface of a video conferencing platform-specific application for the guest when the presentation of a selected approved asset within the custom application is paused in response to the addition of a new, unapproved meeting participant to the meeting. User interface 1450 comprises an example of an update to user interface 1400 of FIG. 14A after the new meeting participant associated with the identifier of joe@a.com, who is determined to be an unapproved meeting participant, joins the meeting. As shown in the example of FIG. 14B, after the new meeting participant associated with the identifier of joe@a.com joins the meeting, joe@a.com's video feed 1452 appears with those of other current meeting participants and furthermore, the new meeting participant is determined to not be an approved, anticipated meeting participant with respect to the meeting. In response to the detected presence of participant joe@a.com, the custom application of the video conferencing platform-specific application pauses the presentation of the slide deck titled "Acme Corp. Pitch" within presentation space 1454 and instead replaces the presentation within presentation space 1454 with that of a predetermined image (e.g., an image that is labeled with "The host has temporarily paused sharing.") Put another way, so long as unapproved participant joe@a.com is present within the meeting, the presentation/screen share of the approved slide deck titled "Acme Corp. Pitch" is paused for all the meeting participants such that none of the meeting participants (including participant joe@a.com) can view any slides from Acme Corp. Pitch. If/when unapproved participant joe@a.com leaves the meeting, the presentation of the slide deck titled "Acme Corp. Pitch" can resume within presentation space 1454.

Various embodiments described herein dynamically ensure that only approved assets are displayed to a given set of approved meeting participants during a video conferencing meeting. The techniques described herein prescribe an efficient workflow along with mechanisms for dynamic modification of in-meeting content presentation, tracking/auditing what was presented when, what conversations took place during that time, and who was present when the content was presented, for example.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a content storage configured to store a set of assets; and
one or more processors configured to:
receive from a first current meeting participant, via a custom application executing within a video conferencing meeting platform-specific application, a selection of an asset to be presented within the custom application during a video conferencing meeting hosted by the video conferencing meeting platform-specific application, wherein the asset is selected from an approved subset of assets stored at the content storage, wherein the video conferencing meeting being in-progress includes a plurality of current meeting participants comprising at least the first current meeting participant and a second current meeting participant;
determine that the second current meeting participant of the plurality of current meeting participants is not approved to view the selected asset; and
in response to the determination that the second current meeting participant is not approved to view the selected asset, prevent the selected asset from being presented within the custom application to the plurality of current meeting participants within the video conferencing meeting.

2. The system of claim 1, wherein the one or more processors are further configured to:
prior to the video conference meeting being in-progress, receive an indication to create or update a new meeting record corresponding to the video conferencing meeting;
receive identifying information associated with a set of anticipated meeting participants that will potentially attend the video conferencing meeting, wherein the set of anticipated meeting participants includes at least a meeting host participant and a meeting guest participant;
receive a selected subset of assets, from the content storage, to potentially present to the set of anticipated meeting participants during the video conferencing meeting;
receive a scheduled date corresponding to the video conferencing meeting; and
store the identifying information associated with the set of anticipated meeting participants, the selected subset of assets, and the scheduled date in the new meeting record.

3. The system of claim 2, wherein the set of anticipated meeting participants is selected from a customer relationship management database.

4. The system of claim 2, wherein the one or more processors are further configured to:
evaluate the new meeting record including to:
determine that metadata associated with the selected subset of assets and attributes of the set of anticipated meeting participants comply with one or more rules; and
in response to the determination that the metadata associated with the selected subset of assets and the attributes of the set of anticipated meeting participants comply with the one or more rules:
determine that the new meeting record is approved;
determine that the selected subset of assets comprises the approved subset of assets; and
determine that the set of anticipated meeting participants comprises approved meeting participants.

5. The system of claim 4, wherein to determine that the second current meeting participant of the plurality of current meeting participants is not approved to view the selected asset comprises to:
compare an identifier associated with the second current meeting participant to identifying information associated with the set of anticipated meeting participants included in the new meeting record; and
in response to a determination that the identifier associated with the second current meeting participant does not match the identifying information associated with the set of anticipated meeting participants, determine that the second current meeting participant of the plurality of current meeting participants is not approved to view the selected asset.

6. The system of claim 1, wherein the selection of the asset to be presented within the custom application during the video conferencing meeting is received from a user interface associated with the custom application.

7. The system of claim 6, wherein the custom application comprises a plugin to the video conferencing meeting platform-specific application.

8. The system of claim 6, wherein the one or more processors are further configured to:
during the video conference meeting, present the approved subset of assets as candidate options in a first user interface of the custom application to the first current meeting participant associated with a host role in the video conferencing meeting; and
during the video conference meeting, omit presenting the approved subset of assets as candidate options in a second user interface of the custom application to a third current meeting participant associated with a guest role in the video conferencing meeting.

9. The system of claim 6, wherein a native screen sharing function of the video conferencing meeting platform-specific application has been disabled.

10. The system of claim 6, wherein to prevent the selected asset from being presented within the custom application to the plurality of current meeting participants within the video conferencing meeting comprises to pause a presentation of the selected asset within the custom application.

11. The system of claim 6, wherein to prevent the selected asset from being presented within the custom application to the plurality of current meeting participants within the video conferencing meeting comprises to obfuscate a presentation of the selected asset within the custom application.

12. The system of claim 6, wherein to prevent the selected asset from being presented within the custom application to the plurality of current meeting participants within the video conferencing meeting comprises to replace a first presentation of the selected asset with a second presentation of predetermined content within the custom application.

13. The system of claim 6, wherein the one or more processors are further configured to:
determine that the second current meeting participant has left the video conferencing meeting; and
in response to the determination that the second current meeting participant has left the video conferencing meeting, display a presentation of the selected asset within the custom application.

14. The system of claim 13, wherein the one or more processors are further configured to store metrics associated with presenting one or more portions of the selected asset during the video conferencing meeting.

15. The system of claim 14, wherein the metrics comprise one or more of the following: a start timestamp and an end timestamp within the video conferencing meeting during which an asset portion was presented and to which one or more meeting participants the asset portion had been presented.

16. A method, comprising:
receiving from a first current meeting participant, via a custom application executing within a video conferencing meeting platform-specific application, a selection of an asset to be presented within the custom application during a video conferencing meeting hosted by the video conferencing meeting platform-specific application, wherein the asset is selected from an approved subset of assets stored at a content storage, wherein the video conferencing meeting being in-progress includes a plurality of current meeting participants comprising at least the first current meeting participant and a second current meeting participant;
determining that the second current meeting participant of the plurality of current meeting participants is not approved to view the selected asset; and
in response to the determination that the second current meeting participant is not approved to view the selected asset, preventing the selected asset from being presented within the custom application to the plurality of current meeting participants within the video conferencing meeting.

17. The method of claim 16, further comprising:
prior to the video conference meeting being in-progress, receiving an indication to create or update a new meeting record corresponding to the video conferencing meeting;
receiving identifying information associated with a set of anticipated meeting participants that will potentially attend the video conferencing meeting, wherein the set of anticipated meeting participants includes at least a meeting host participant and a meeting guest participant;
receiving a selected subset of assets, from the content storage, to potentially present to the set of anticipated meeting participants during the video conferencing meeting;
receiving a scheduled date corresponding to the video conferencing meeting; and
storing the identifying information associated with the set of anticipated meeting participants, the selected subset of assets, and the scheduled date in the new meeting record.

18. The method of claim 17, further comprising:
evaluating the new meeting record including:
determining that metadata associated with the selected subset of assets and attributes of the set of anticipated meeting participants comply with one or more rules; and
in response to the determination that the metadata associated with the selected subset of assets and the attributes of the set of anticipated meeting participants comply with the one or more rules:
determining that the new meeting record is approved;
determining that the selected subset of assets comprises the approved subset of assets; and
determining that the set of anticipated meeting participants comprises approved meeting participants.

19. The method of claim 18, wherein determining that the second current meeting participant of the plurality of current meeting participants is not approved to view the selected asset comprises:
comparing an identifier associated with the second current meeting participant to identifying information associated with the set of anticipated meeting participants included in the new meeting record; and
in response to a determination that the identifier associated with the second current meeting participant does not match the identifying information associated with the set of anticipated meeting participants, determining that the second current meeting participant of the plurality of current meeting participants is not approved to view the selected asset.

20. The method of claim 16, wherein the selection of the asset to be presented within the custom application during the video conferencing meeting is received from a user interface associated with the custom application.

* * * * *